LARGE CAPACITY SEQUENTIAL BUFFER

Filed April 19, 1962 9 Sheets-Sheet 1

INVENTOR.
WALTER KLEIN
BY Samuel B. Stone
ATTORNEY

INVENTOR.
BY WALTER KLEIN
Samuel B. Stone
ATTORNEY

LARGE CAPACITY SEQUENTIAL BUFFER

Filed April 19, 1962 9 Sheets-Sheet 3

INVENTOR.
WALTER KLEIN
BY Samuel B. Stone
ATTORNEY

LARGE CAPACITY SEQUENTIAL BUFFER

Filed April 19, 1962 9 Sheets-Sheet 4

INVENTOR.
WALTER KLEIN
BY Samuel B. Stone
ATTORNEY

INVENTOR.
WALTER KLEIN
BY Samuel B. Stone
ATTORNEY

Feb. 15, 1966 W. KLEIN 3,235,849

LARGE CAPACITY SEQUENTIAL BUFFER

Filed April 19, 1962 9 Sheets-Sheet 6

INVENTOR.
WALTER KLEIN
BY Samuel B. Stone
ATTORNEY

INVENTOR.
BY WALTER KLEIN
Samuel B. Stone
ATTORNEY

INVENTOR.
WALTER KLEIN
BY Samuel B. Stone
ATTORNEY

INVENTOR.
WALTER KLEIN
BY Samuel B. Stone
ATTORNEY 3,235,849

LARGE CAPACITY SEQUENTIAL BUFFER

Walter Klein, Santa Ana, Calif., assignor to Beckman Instruments, Inc., a corporation of California Filed Apr. 19, 1962, Ser. No. 188,697
17 Claims. (Cl. 340—172.5)

Figure 1:
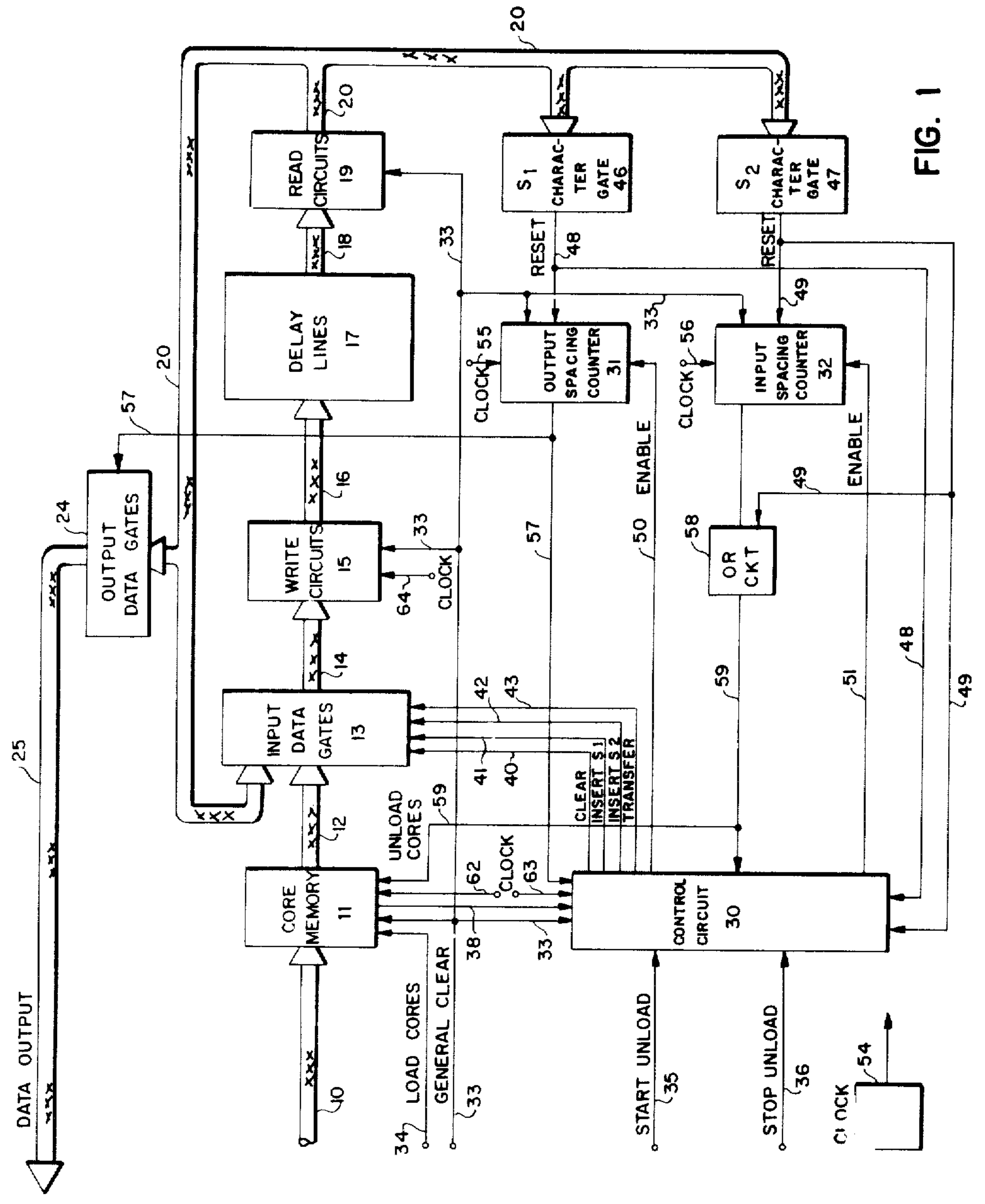

The present invention relates to a sequential buffer and, more particularly, to a large capacity sequential buffer having the equivalent characteristics of a large core buffer but which includes only a small static buffer and a large cyclic memory buffer.

In data handling equipment it is frequently necessary to transfer data from one device operating at a particular speed or asynchronously to another device operating at a different speed. For example, it may be necessary to transfer data from a computer or the like operating at an asynchronous speed to a read-out device, such as a magnetic tape unit, operating at a synchronous speeed. A core memory may be employed for this purpose, and the core memory receives input data at an asynchronous rate and is read out at one or more particular synchronous rates. Although core memories perform this buffering function in an efficient manner, such memories are expensive.

Accordingly, it is a feature of the present invention to provide a large capacity sequential buffer having the characteristics of, but being less expensive than, an equivalent capacity core buffer, and which employs a small static memory and a large cyclic memory.

An additional feature of the present invention is the provision of a buffer including a cyclic memory, such as delay lines, to supply the main storage capacity and a small magnetic core memory to store data during the access time of the cyclic memory.

A further feature of the present invention is the provision of a sequential buffer employing a core memory and a cyclic memory, and which receives data at an asynchronous rate, stores this data and supplies the data at its output at one or more synchronous rates.

Another feature of the present invention is the provision of a large capacity sequential buffer having the characteristics of an equivalent magnetic core buffer and which includes a cyclic memory in which information is stored in an interlaced fashion.

A further feature of the present invention is the provision of a large capacity sequential buffer having the characteristics of an equivalent magnetic core buffer and which includes a cyclic memory in which information is stored in an interlaced fashion and which requires no address for the retrieval of the stored information.

In accordance with the teachings of the present invention, a large capacity sequential buffer having the characteristics of a large sequential magnetic core buffer is provided in which the main storage capacity is provided by a cyclic memory and a small static buffer stores incoming information during the cyclic memory access time. Input data may be supplied asynchronously to the small buffer. This data is read from the small buffer into the cyclic memory at one or more fixed rates which determine the high speed output rates of the entire sequential buffer. This data is read from the small buffer into the cyclic memory at one or more fixed rates which determine the high speed output rates of the entire sequential buffer. The data applied to the cyclic memory is time spaced so that it is available from the cyclic memory at the desired rate or rates. This data is interlaced in the cyclic memory in order to fully utilize the capacity thereof. Special characters are inserted into the cyclic memory to indicate the beginning and the end of data inserted into the cyclic memory. The small buffer may be a core memory, or the like, and the cyclic memory may include magnetostrictive delay lines or other cyclic memory devices, such as, drum or disc storage units.

In an illustrative arrangement according to the present invention a large capacity sequential buffer is provided including a small magnetic core buffer, for example, having a capacity of 256 characters and a large magnetostrictive delay line buffer, for example, having a capacity of 6,013 characters. Each character may have seven bits, one or more of which may be used for error checking purposes if desired. A delay line is employed for each bit of the character and, therefore, seven delay lines are utilized. Data is stored in the core memory which in turn holds this data during the access time of the delay lines. First and second special characters are inserted into the delay lines spaced apart a predetermined period of time (equal to a predetermined number of bit spaces). The first data character is read from the core memory and replaces the second special character in the delay lines. Additional data characters are read from the core memory and are entered into the delay lines in a like spaced relationship, or input rate, which in turn determines the output rate of the delay lines. The last data character is followed by the reinsertion of the second special character to indicate the end of the data within the delay lines. The characters continue to recirculate in the delay lines as long as desired.

In order to read data from the delay lines, the first special character (indicating the beginning of data characters) is sensed, and utilized to gate out the data characters at the proper times in a sequential manner, i.e., in the same sequence as they were entered into the delay lines. By the proper choice of delay line capacity and time spacing of data characters, the data characters are interlaced within the delay lines in order to fully utilize the maximum capacity of the delay lines. No address is necessary to recover particular data, it only being necessary to sense the first special character which always precedes the first data character and utilize this special character to control the read out of the data characters.

Figure 2A:
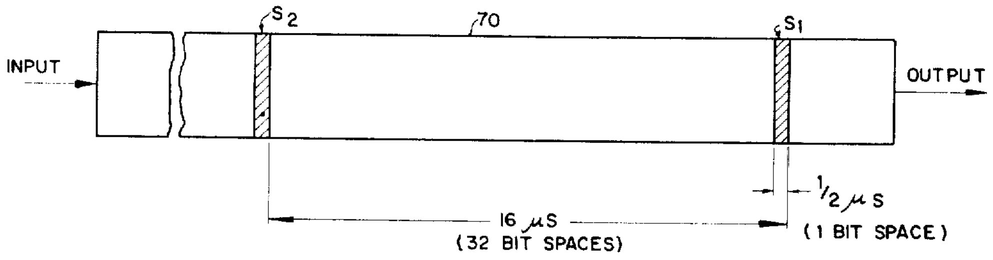
Figure 2B:
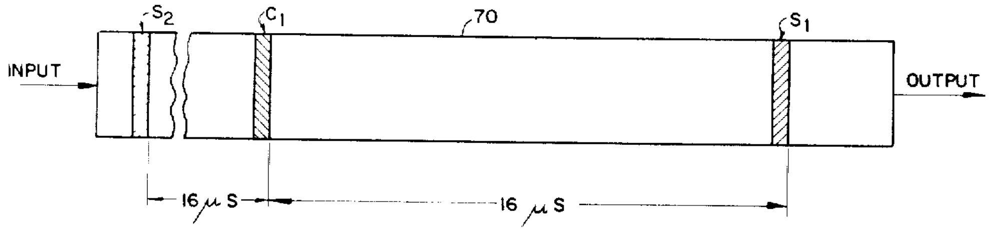
Figure 2C:
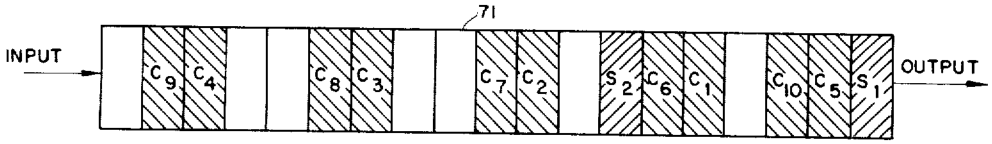
Figure 3:
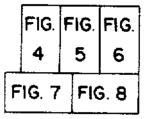
Figure 5:
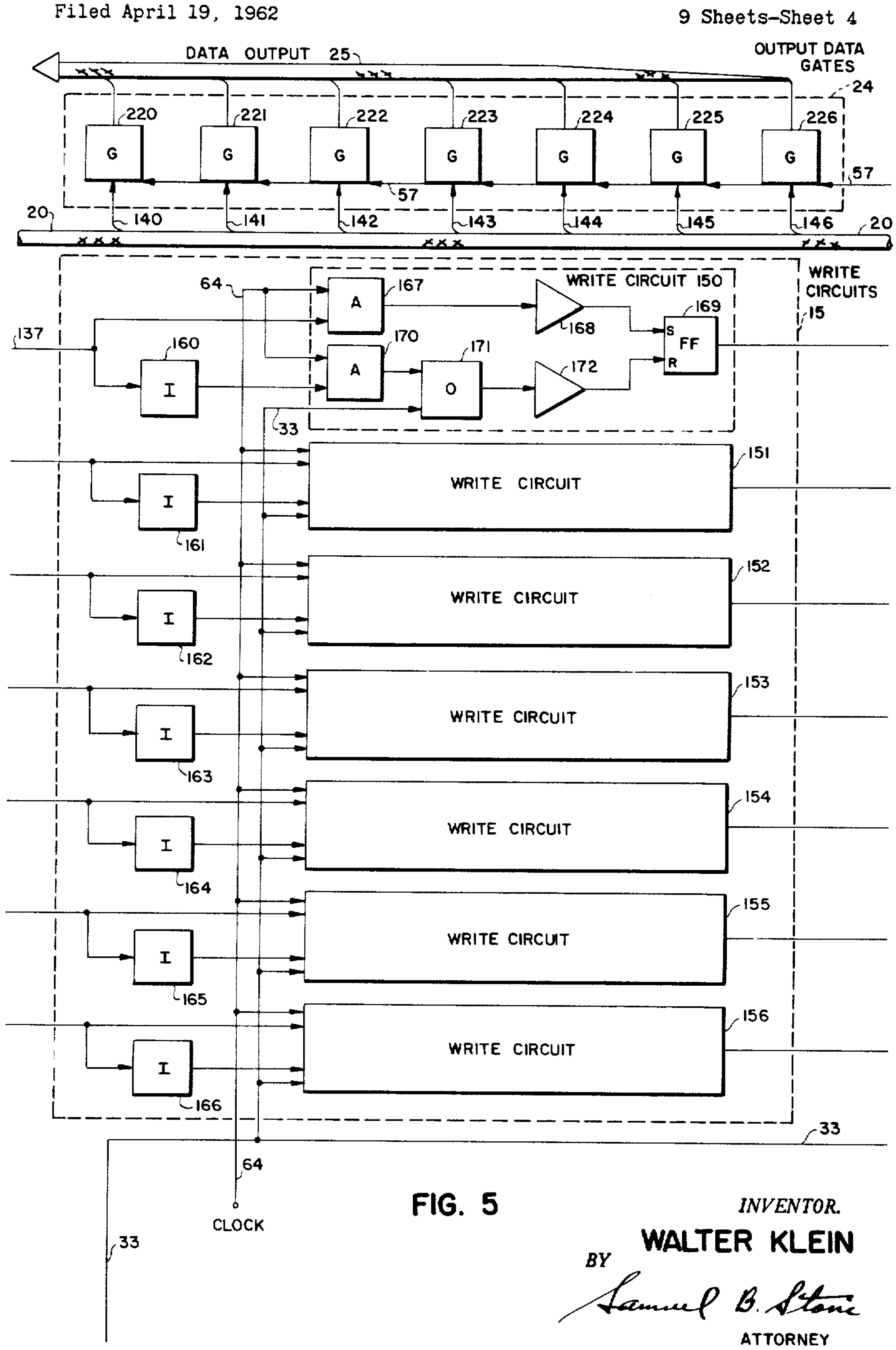
Figure 6:
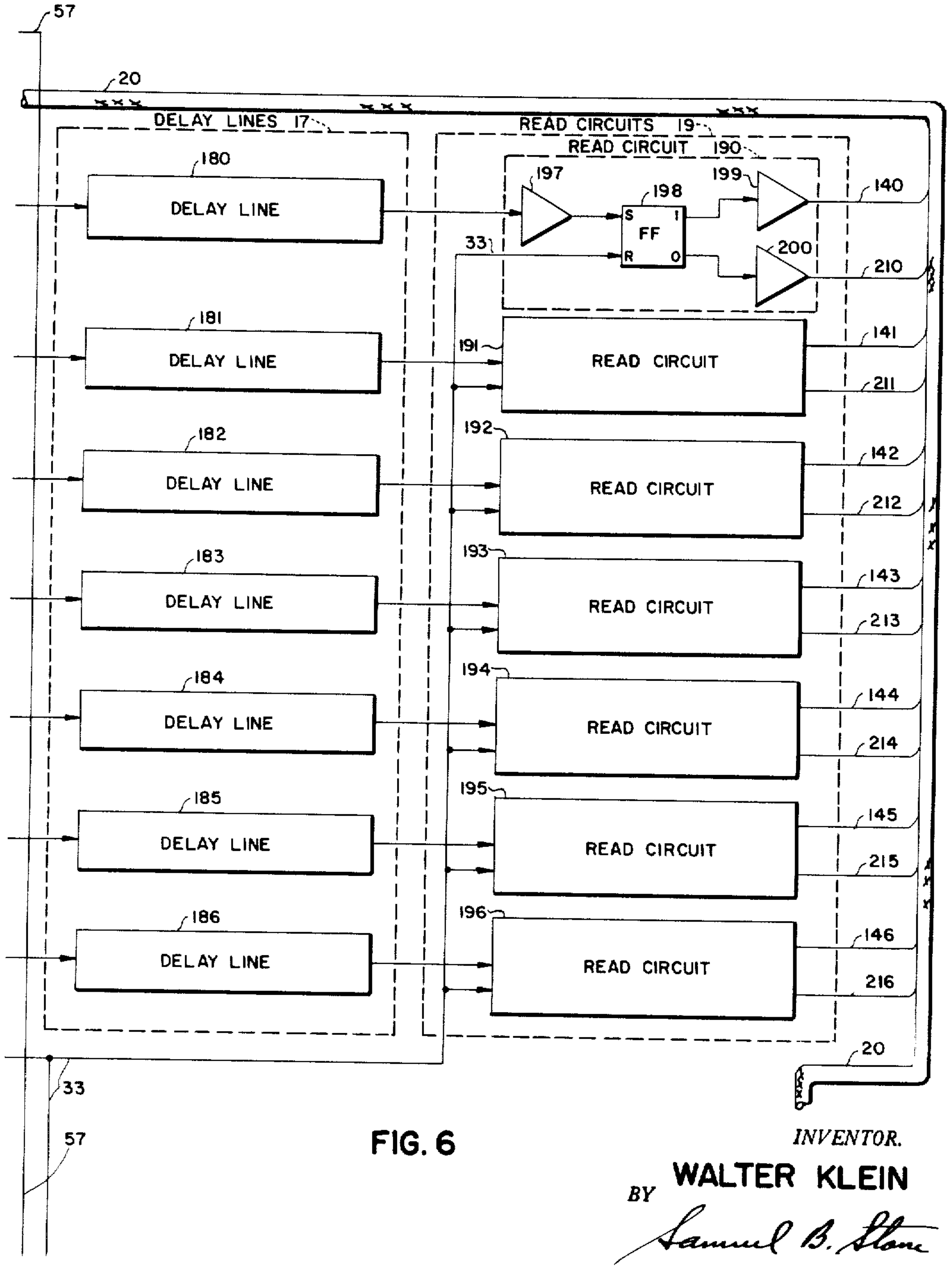
Figure 9:
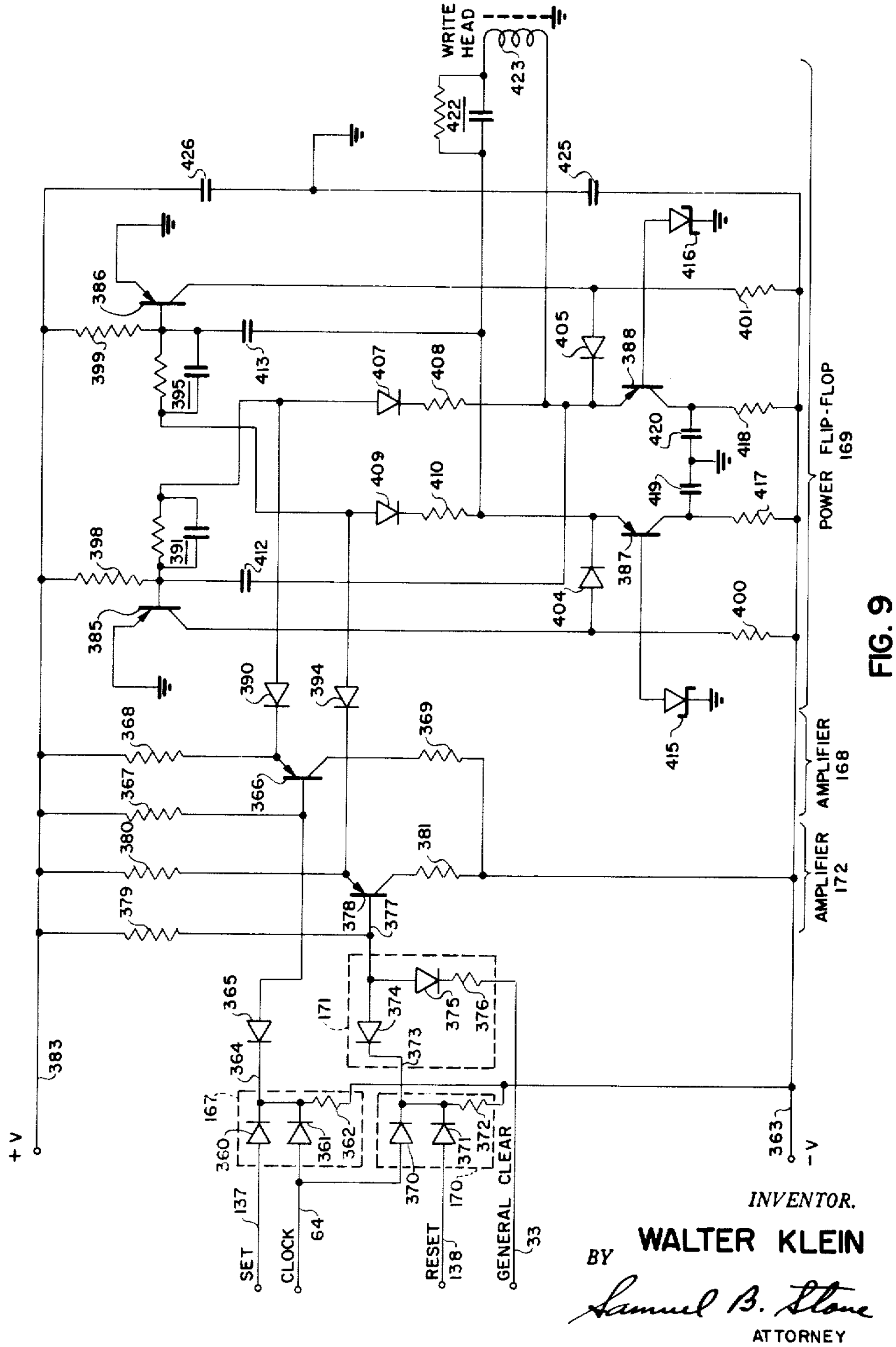
Figure 10:
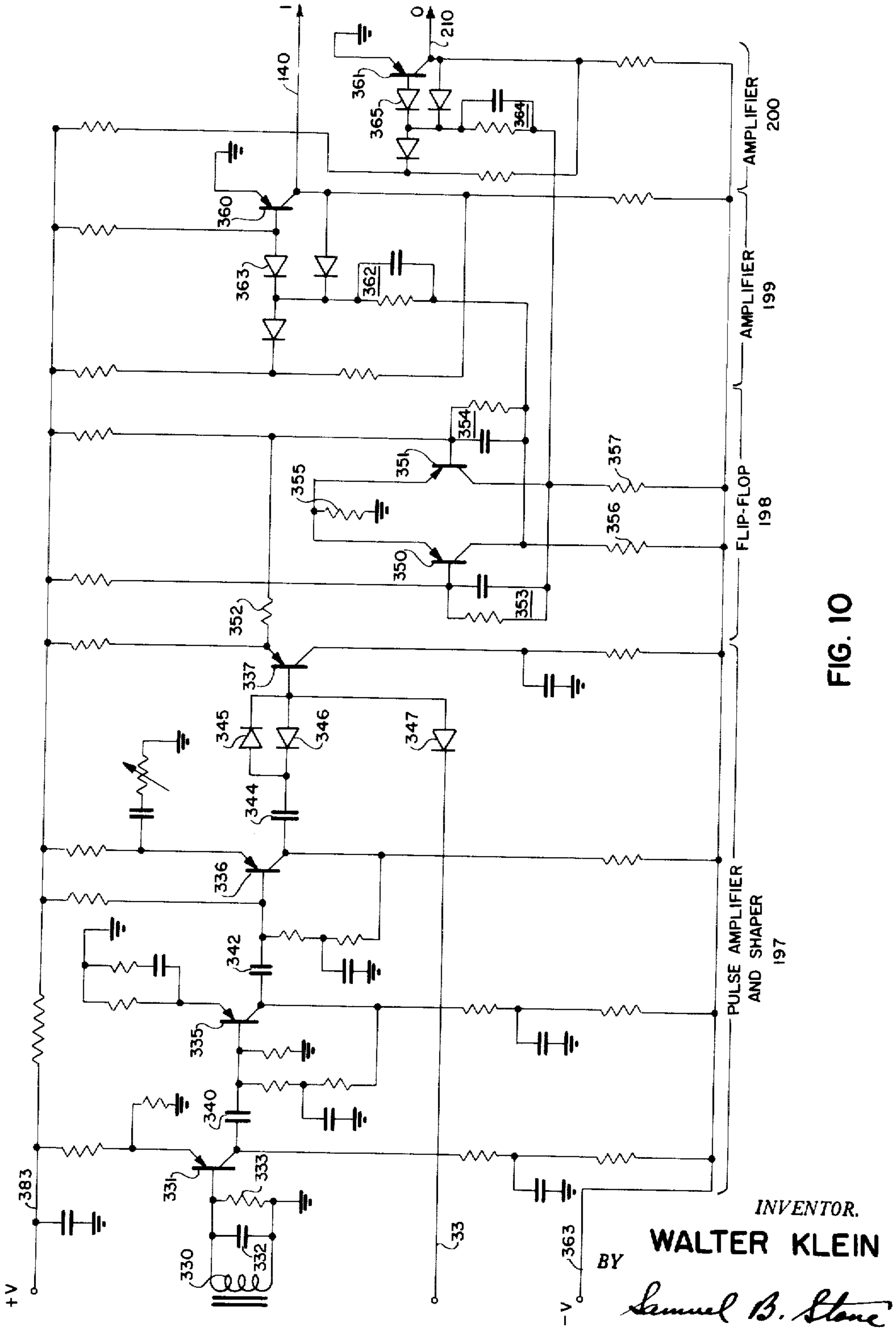

Other features and objects of the invention will be better understood from a consideration of the following detailed description when read in conjunction with the attached drawings in which:

FIG. 1 is a general block diagram of a large capacity sequential buffer constructed in accordance with the teachings of the present invention;

FIGS. 2*a*, 2*b* and 2*c* illustrate the manner in which data is stored in the delay lines of the buffer in FIG. 1;

FIG. 3 illustrates the manner in which FIGS. 4 through 8 is arranged;

FIGS. 4 through 8 when arranged as illustrated in FIG. 3 illustrate in detail block diagram form the sequential buffer shown in FIG. 1;

FIG. 9 is a schematic diagram of one of the write circuits shown in block form in FIG. 5; and FIG. 10 is a schematic diagram of one of the read circuits shown in block form in FIG. 6.

Cables are used throughout the drawings to transfer data, and they are illustrated as two parallel lines with arrow heads at one end thereof. The input and the output lines of the block symbols are connected to the most convenient side of the block including the same side in some cases. An input line to a corner of a block symbol and an output line from the adjacent corner of that block symbol indicate that the signals are applied to the input of the circuit represented by the block and the input conductor is electrically connected to the output conductor of the adjacent corner. The bold face character symbols occurring within a block symbol identify the common name for the circuits represented, that is, "A" identifies a logical And circuit; "O," a logical Or circuit; "G," a gate circuit; "FF," a flip-flop; "MV," a multivibrator and "I," an inverter. The triangular symbol is used, as is conventional, to represent an amplifier.

In the description of the sequential buffer of the present invention a general arrangement of an illustrative buffer is first described in connection with an over-all block system diagram with respect both to the manner in which the various circuit components and apparatus are interconnected and in respect to the general over-all operation which is performed by these components and apparatus. The general description is followed by a separate and detailed description of the over-all system, along with descriptions of the various components and apparatus which so require it.

Referring now to the drawings, FIG. 1 illustrates in block diagram form an illustrative large capacity sequential buffer constructed in accordance with the teachings of the present invention. Input data is applied through a cable 10 to a conventional core memory 11 which, for example, may have a storage capacity of 256 characters. According to a feature of this invention, the output of the core memory 11 is connected through a cable 12, input gates 13, a cable 14, write circuits 15 and a cable 16 to delay lines 17. One delay line is employed for each bit of a character. The outputs of the delay lines 17 are connected through a cable 18, read circuits 19 and a cable 20 to the input data gates 13. The input data gates 13 serve to gate the data from the core memory 11 to the delay lines 17, or to allow the data in the delay lines to recirculate through the cable 18, the read circuits 19, the cable 20, the input data gates 13, the cable 14, the write circuits 13, the cable 16 and the delay lines 17. The outputs of the delay lines 17 also are connected through the cable 18, the read circuits 19 and the cable 20 to output data gates 24. The output data gates 24 are connected to a cable 25 which supplies the output data to a read-out device, such as, a magnetic tape unit.

Forgetting for the moment the control functions necessary to properly operate the sequential buffer shown in FIG. 1, the core memory 11 and the delay lines 17 are cleared (and all bistable devices are reset) followed by the entry of data through the cable 10 to the core memory 11. This data may be entered into the core memory at an asynchronous rate. After the delay lines 17 are cleared (by not applying data to the delay lines for a particular period of time), a first special character, termed S1, is entered into the delay lines 17 by the input data gates 13 through the write circuits 15. After a predetermined period of time (for example, 32 character times) a second special character, termed S2, is entered into the delay lines 17 by the input data gates 13 through the write circuits 15. The sequential buffer now is ready to receive data characters from the core memory 11. The special character S2 is sensed and replaced by the first data character which is applied from the core memory 11 through the input data gates 13 and the write circuits 15 to the delay lines 17. Succeeding data characters are similarly spaced in the delay lines 17, with the last data character being followed by the reinsertion of the special character S2. Assuming the delay lines 17 are not full, additional data characters may be entered into the delay lines 17 at a later time by replacing the special character S2 by the first data character subsequently added, followed by additional data characters and, finally, reinsertion of the special character S2 at the end of the subsequently entered data. At this time, the special character S1, the data characters and the special character S2 are recirculating in the delay lines 17 through the read circuits 19, the cable 20, the input data gates 13 and the write circuits 15. The characters circulate as long as desired. Data is read from the sequential buffer in FIG. 1 by sensing the special character S1 and in turn conditioning the output data gates 24 to allow the data to pass to an output device.

A control circuit 30 functions to receive certain command signals and in turn controls the operation of the input data gates 13, and enables the operation of an output spacing counter 31 and an input spacing counter 32. A line 33 which supplies an initial general clear pulse is connected to the core memory 11, the write circuits 15, the read circuits 19, the control circuit 30, the output spacing counter 31 and the input spacing counter 32. The signal supplied on the general clear line 33 clears the core memory 11, the delay lines 17 and resets all bistable elements in the sequential buffer initially to condition the buffer for operation. A line 34 supplies a conditioning signal to the core memory 11 to allow input data to be loaded into the core memory. Lines 35 and 36 are connected to the control circuit 30 to supply start unload and stop unload signals, respectively, to control the unloading, or read out, of the delay lines 17. A line 38 is connected from the core memory 11 to the control circuit 30 to supply a signal to the control circuit 30 to indicate when the core memory is empty (and an inverse signal when it is not empty).

A line 40 is connected from the control circuit 30 to supply a clear signal to the input data gates 13. A clear signal deconditions the gates 13 to prevent data from being entered into the delay lines 17. Lines 41 and 42 are connected from the control circuit 30 to the input data gates 13 to control the insertion of special characters S1 and S2, respectively. A line 43 is connected from the control circuit 30 to the input data gates 13 to control the transfer of characters from the core memory 11 to the delay lines 17.

The outputs from the delay lines 17 are connected through the cable 18, the read circuits 19 and the cable 20 to S1 and S2 character gates 46 and 47, respectively. The output of the S1 character gate 46 is connected through a line 48 to the output spacing counter 31 and to the control circuit 30. The output of the S2 character gate 47 is connected through a line 49 to the input spacing counter 32 and to the control circuit 30. The S1 character gate 46 provides a reset output signal when the S1 character is available at the output of the read circuits 19, and supplies this signal over the line 48 to reset the output spacing counter 31. This signal also is applied to the control circuit 30. The S2 character gate 47 senses the occurrence of the S2 character at the output of the read circuits 19, and supplies a reset signal over the line 49 to reset the input spacing counter 32, and supplies a signal through the line 49 to the control circuit 30.

Lines 50 and 51 are connected from the control circuit 30 to the respective counters 31 and 32 to supply enabling signals thereto. A clock 54 supplies clock signals to the clock inputs 55 and 56 of the respective counters 31 and 32. When either of the counters 31 or 32 is reset and enabled, it counts the clock pulses and provides an output upon the occurrence of a predetermined number of clock pulses. This number of clock pulses is equal to the spacing of characters in the delay lines 17. For example, in the illustration to follow hereinafter the delay lines may have a length of 3,006.5 microseconds, a capacity of 6,013 characters or one character per one-half microsecond, and the characters are spaced 16 microseconds or 32 character spaces apart. The spacing counters count from zero through 31 and provide an output upon the occurrence of each thirty-second clock pulse. Hence, the output spacing counter 31 is reset upon the occurrence of an S1 character and provides an output on the line 57 to indicate when the first data character is available at the output data gates 24 and conditions these gates through the line 57. When data characters have been unloaded, the counter 31 controls the reinsertion of an S1 character by supplying a signal through the line 57 to the control circuit 30.

The input spacing counter 32 is reset upon the occurrence of an S2 character, and begins counting clock pulses on the line 56 after it is enabled. An Or circuit 58 is connnected with the reset line 49 from the gate 47 and with the output of the counter 32. The Or circuit 58 supplies an output signal on the line 59 upon the occurence of an S2 character or at a count of 31 to supply an unload signal to the core memory 11 and a conditioning signal to the control circuit 30. The control circuit 30 in turn supplies a signal on the line 43 to allow the input data gates 13 to transfer characters from the core memory 11 to the delay lines 17.

The clock 54 also supplies clock signals to a clock input 62 connected to the core memory 11, a clock input 63 connected to the control circuit 30 and a clock input 64 connected to the write circuits 15. The clock 54 actually may be the clock in equipment associated with the sequential buffer in FIG. 1 rather than a separate clock for the buffer. The clock 54 also supplies clock pulses to the bistable devices in the sequential buffer circuit in order to assure synchronous operation thereof. The same clock pulses are applied to all clock inputs.

A description of the operation of the sequential buffer illustrated in FIG. 1 will be given subsequently, but it is believed that an understanding of the operation thereof will be facilitated by first considering the storage of data in the delay lines 17, one of which is illustrated generally in FIGS. 2*a* and 2*b*. FIG. 2*a* illustrates a delay line 70 in which respective bits of the special characters S1 and S2 have been stored preparatory to the entry of data therein. Assuming, as noted before, that each delay line has a length of 3,006.5 microseconds and a capacity of 6,013 bits, one bit occupies one-half microsecond of the length of the line and the bits are spaced 16 microseconds apart or 32 bit spaces. It should be remembered that these lines are cyclic (and could be other cyclic memory devices) and, therefore, the bits are continuously moving through the lines. The bit of the character S1 is entered into the line, and 16 microseconds later the bit of the character S2 is entered into the line as illustrated in FIG. 2*a*.

According to another feature of the present invention, data characters are entered into the line by sensing the character S2 and replacing it with the first data character C1. FIG. 2*b* illustrates the relationship between bits of the character S1 and the first data character C1. If only one data character is entered into the delay lines, the special character S2 is reinserted into the lines 16 microseconds after the first data character C1 is entered. If a plurality of data characters are to be entered into the lines, the first one is entered in place of the special character S2 (as illustrated by the bit C1 in FIG. 2*b*), followed by subsequent data characters spaced 16 microseconds apart (the first of which is spaced 16 microseconds from the first data character C1), followed eventually by the special character S2 16 microseconds after the last data character.

According to a further feature of this invention, the capacity and the length of the delay lines is chosen to provide interlacing of the characters in order to utilize the full capacity of the delay lines. In other words, as the data returns to be recirculated in the delay lines, the next data character is entered next to the character S1, the following data character is entered next to the character C1, etc., this operation continuing as long as data characters are available and until the delay lines are full. Although the details of the delay lines will be discussed in greater detail subsequently, the principle of interlacing is illustrated in FIG. 2*c*. This figure shows a single small delay line 71 having a bit capacity of 19 bits (17 data bits and two special character bits). The bit spacing is chosen as four spaces. The bit capacity, C, is equal to the bit spacing times K minus 1, where K is any desired integer to provide the desired capacity. A one is subtracted (or added) to provide for interlacing of the bits.

The scale for FIG. 2*c* is different than for FIGS 2*a* and 2*b* to better illustrate the relationship of the bits.

FIG. 2*c* illustrates the interlacing of 10 data bits in the delay line 71. Initially, the bit of the character S1 is stored followed by the bit of the character S2 in the position where the bit C1 now is shown. When the bits are to be entered, the bit C1 replaces the bit S2, followed by the entry of the bits C2 through C10 in an interlaced relationship as shown. After the last bit, C10, is entered, the bit of the character S2 is reinserted. The line 71 in FIG. 2 is not shown filled, but if filled, it would accommodate bits of characters C1 through C17 plus the two bits of the special characters S1 and S2. If the delay line 71 were filled, the bit of the special character S2 would be stored to the right of the bit C4 in FIG. 2*c*.

Turning again to FIG.1, the sequential buffer is operated by applying clock pulses from the clock 54 to the clock inputs 55, 56 and 62 through 64. The same clock pulses are applied to all clock inputs. Although not shown in FIG. 1, the clock pulses also are applied to the set and the reset inputs of all flip-flops in the sequential buffer in order to maintain synchronism.

A general clear pulse is applied to the line 33 which clears the core memory 11, and is applied to the write circuits 15, the read circuits 19, the output spacing counter 31 and the input spacing counter 32 to reset the flip-flops in these respective units. The general clear pulse also is applied through the line 33 to the control circuit 30. In response thereto, the control circuit 30 supplies a clear signal through the line 40 to the input data gates 13 to prevent any data from being entered into the delay lines 17. According to another feature of this invention, the general clear pulse also subsequently (after the delay lines are cleared) causes the control circuit 30 to supply a signal through the line 41 to the input data gates 13 which in turn insert the first special character S1 in the delay line 17. After a predetermined period of time (for example, 16 microseconds or 32 character spaces) the control circuit 30 supplies a signal on the line 42 to the gates 13 which in turn insert the second special character S2 in the delay lines 17. Any time after the occurrence of the general clear pulse, input data may be supplied through the cable 10 to the core memory 11 and stored therein upon the occurence of a load signal on the line 34. The sequential buffer now is ready for the entry of data characters into the delay lines 17.

The transfer of data from the core memory 11 begins when the special character S2 is sensed by the S2 character gate 47. The S2 character gate 47 supplies a signal on the line 49 to reset the input spacing counter 32. The gate 47 also supplies a signal on the line 49 to the control circuit 30 which in turn supplies an enable signal on the line 51 to the counter 32 if the core memory 11 is not empty, i.e., the counter 32 is not enabled if the core memory 11 is empty and has no data to be transferred to the delay lines 17. After the input spacing counter 32 is enabled, it counts from zero through 31 in response to input clock pulses on the line 56. The output from the gate 47 also is applied through the Or circuit 58 to the control circuit 30 and to the core memory 11. This signal causes the core memory 11 to unload the first data character, and causes the control circuit 30 to supply a signal on the line 43 to condition the input data gates 13 to transfer this first data character to the write circuits 15. The write circuits 15 function to amplify the data character and gate it into the delay lines 17 in synchronism with a clock pulse. Hence, the first data character replaces the special character S2 in the delay lines 17 and no addressing is required.

The input spacing counter 32 counts the clock pulses, and after it counts from zero through 31 (16 microseconds after the first data character is entered into the delay line 17) the counter 32 supplies a signal through the Or circuit 58 and the line 59 to the core memory 11 to cause the core memory to unload the second data character. This signal also is applied to the control circuit 30 which in turn supplies a signal through the line 43 to condition the input data gates 13 to transfer the second data character to the write circuits 15.

This operation continues, with data characters being entered into the delay lines 17 spaced 16 microseconds apart in an interlaced fashion until the core memory 11 becomes empty. When the core memory 11 becomes empty, a signal is supplied on the line 38 to the control circuit 30 and upon the occurrence of the next output from the input spacing counter 32, the control circuit 30 supplies a signal on the line 42 to the input data gates 13 to cause the special character S2 to be reinserted into the delay lines 17. If the delay lines 17 are not full, and data is subsequently entered into the core memory 11, the data in the core memory 11 may be transferred into the delay lines by sensing the special character S2 in the same manner discussed above. It should be noted that the counters 31 and 32 count only when they are enabled. The counter 32 is enabled by the control circuit 30 only when an S2 character occurs and the core memory 11 contains data, and the counter 31 is enabled by the control circuit 30 only when the S1 character occurs and a start-unload signal is supplied on the line 35 to the control circuit 30.

The data stored in the delay lines 17 recirculates as discussed before until it is desired to supply this data to an output device. According to another feature of this invention, the data is read from the output data gates 24 at a synchronous rate determined by delay line constants and the rate at which data is read into the lines which, in the example given above, is 62.5 kc. Data also may be read out at an asynchronous rate up to 1 divided by the length of the line (3.0065 ms.), which in the above example is approximately 365 characters per second. As will be discussed hereinafter, one or more different synchronous output rates may be provided by utilizing delay lines of a particular length and by different spacings of characters (by changing the range of the output and input spacing counters 31 and 32) in the delay lines.

When the delay lines 17 have data characters stored therein, these characters may be read out by applying a signal to the start-unload line 35 connected to the control circuit 30. The unloading is accomplished by applying this start-unload signal and sensing the S1 character, after which the spaced data characters are unloaded sequentially from the buffer without requiring addressing of the data. When the S1 character gate 46 senses the S1 character, a signal is supplied on the line 48 to the output spacing counter 31 and to the control circuit 30. The signal applied to the counter 31 resets the counter. The signal applied from the gate 46 to the control circuit 30 functions together with the start-unload signal applied to the line 35 to cause the control circuit 30 to supply a signal on the line 40 to decondition the input data gates 13. This operation prevents the input data gates 13 from passing the character S1 back into the delay lines 17. The control circuit 30 in response to the start-unload signal on the line 35 and the reset signal on the line 48 also supplies an enable signal on the line 50 to the counter 31 to enable the counter 31 to commence counting clock pulses. The counter 31 continually counts from zero to 31 and provides an output pulse on the line 57 at each count of 31. The signal on the line 57 is applied to condition the output gates 24 to allow the data to be read from the sequential buffer.

The read-out of data from the buffer may be stopped whether the delay lines 17 are empty or not by supplying a stop-unload signal on the line 36 to the control circuit 30. After a stop-unload signal is applied to the control circuit 30, the occurrence of a signal on the line 57 causes the control circuit 30 to disable the counter 31 by applying a signal on the line 50 thereto, and to supply a signal on the line 41 to cause the input data gates 13 to reinsert the character S1 in the delay lines 17.

At this time all, or a certain number of data characters may have been read from the delay lines 17. If there are data characters still to be read out, they may be read out subsequently by applying a start-unload signal to the control circuit 30. In either case, additional data characters may be transferred from the core memory 11 to the delay lines 17 by sensing the S2 character as discussed above. It is noted that the data read out continues to recirculate in the delay lines 17 until replaced by new data. Only the special character S1 need be cleared (by deconditioning the input data gates 13) when data is read from the delay lines. Additional data may be read into the core memory 11 while data is being read from the sequential buffer.

It now should be apparent that the delay lines 17 provide the main memory capacity of the sequential buffer, whereas, the core memory 11 may have a relatively smaller capacity since it only has to store data until it can be entered into the delay lines 17. It also should be apparent that data can be read into the sequential buffer asynchronously and read out at one or more synchronous speeds and at an asynchronous rate from zero up to one divided by the length of the delay lines. The full capacity of the delay lines is utilized by interlacing the characters, and also, if desired, by utilizing a non-return-to-zero arrangement for the write and read circuits for the delay lines to provide maximum storage of data in the delay lines as will be discussed subsequently. Additional special characters (and associated character gates and counters) may be employed to indicate additional factors concerning the data, if desired.

The sequential buffer illustrated generally in FIG. 1 is shown in greater detail in FIGS. 4 through 8 when arranged as illustrated in FIG. 3. The same reference numerals as used in FIG. 1 are used to designate like components in FIGS. 4 through 8. The description will commence with a discussion of the data paths (FIGS. 4 through 6) followed by a discussion of the control circuits and signals necessary to control the storage and proper flow of data.

Figure 4:
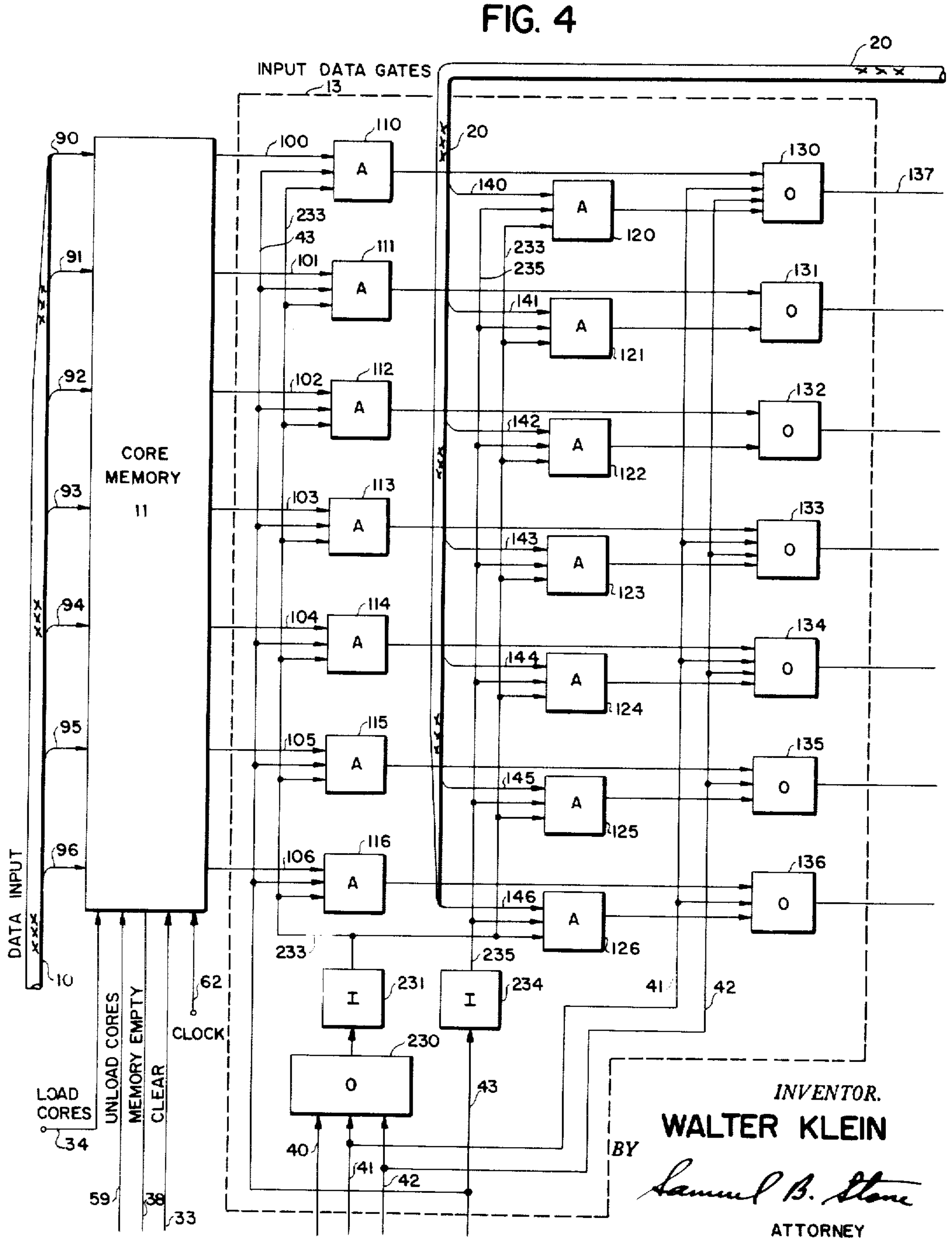

The core memory 11 is shown as a box 11 in FIG. 4. This memory is conventional and may be any one of numerous commercially available core memories, such as, type RB random access memory manufactured by Ampex Computer Products Company, P.O. Box 329, Culver City, California. This particular memory has a storage capacity of 256 words (or characters), with seven bits per word. As noted previously, the core memory 11 must have sufficient capacity to store data during the maximum delay line access time of 3,006.5 microseconds. Hence, the capacity of the core memory must be equal to or greater than the length of the delay line divided by the spacing of the characters, or 3,006.5÷16 which is approximately equal to 190 characters.

Lines 90 through 96 are connected from the input data cable 10 to the core memory 11. Although single lines are illustrated, it is to be understood that pairs of lines may be employed to provide both one and zero inputs for each bit. The general clear line 33 and the load control line 34 are connected to the core memory 11 as discussed in connection with FIG. 1. The output of the core memory 11 is connected through lines 100 through 106 to the input data gates shown within the dashed line box 13 in FIG. 4. The input data gates 13 include And circuits 110 through 116 for controlling the flow of data from the core memory 11, and And circuits 120 through 126 which control the recirculation of data stored in the delay lines 17 in FIG. 6. The input data gates 13 also include Or circuits 130 through 136 which serve to pass the outputs of the And circuits 110 through 116 or the And circuits 120 through 126. The lines 100 through 106 from the core memory 11 are connected to respective And circuits 110 through 116, and the And circuits 110 through 116 are connected to the respective Or circuits 130 through 136.

Lines 140 through 146 are connected from the cable 20 to the respective And circuits 120 through 126. The outputs from the And circuits 120 through 126 are connected to the Or circuits 130 through 136, respectively. The outputs of the Or circuits 130 through 136 are connected to respective write circuits 150 through 156. The outputs of the Or circuits 130 through 136 also are connected through respective inverters 160 through 166 to the respective write circuits 150 through 156.

The write circuits 150 through 156 serve to amplify and gate the special characters and data characters into the delay lines 17 (FIG. 6) at the proper times. Each of the write circuits 150 through 156 includes logic components like those shown for the write circuit 150 in FIG. 5. The write circuit 150 includes an And circuit 167 connected through a line 137 from the Or circuit 130 in FIG. 4. The output of the And circuit 167 is connected through an amplifier 168 to the set input of a power flip-flop 169. The write circuit 150 also includes an And circuit 170 connected through a line 138 from the inverter 160. The output of the And circuit 170 is connected through an Or circuit 171 and an amplifier 172 to the reset input of the flip-flop 169. The inverters 160 through 166 are illustrated since only the binary one lines are shown. These inverters insure that the write circuit flip-flops (such as flip-flop 169) are reset upon the occurrence of a binary zero. It will be apparent to those skilled in the art that these inverters are not necessary if the one and zero lines for each binary bit are included in the circuit. This latter arrangement is not illustrated since it merely requires a duplication (for the zero lines) of the And circuits 110 through 116, the And circuits 120 through 126, and the Or circuits 130 through 136. The clock line 64 is connected to the And circuits 167 and 170 in the write circuit 150, and to the equivalent And circuits in the write circuits 151 through 156. The general clear line 33 is connected to the Or circuit 171 in the write circuit 150, and to the equivalent Or circuits in the write circuits 151 through 156.

The write circuits 150 through 156 supply the necessary write current to the write transducers (not shown) associated with the delay lines 180 through 186 shown within the dashed line box 17 in FIG. 6. In practice, the flip-flop 169 has both a one and a zero output, which outputs are connected to opposite terminals of the delay line write transducer. The particular connections will be discussed hereinafter when the schematic diagram (FIG. 9) of the write circuits is considered in greater detail. The delay lines 180 through 186 are cyclic memory elements and, of course, other cyclic memory devices, such as, drums and discs, may be employed instead of delay lines. If delay lines are employed, magnetostriction delay lines, model 40, type 1, manufactured by Ferranti Electric, Inc., Electronics Division, 95 Madison Avenue, Hempstead, Long Island, New York, are suitable. For purposes of illustration, a delay line of the above type having a length of 3,006.5 microseconds and a capacity of 6,013 bits is assumed. As will be explained subsequently, other length delay lines may be employed if desired. Also, a different number of delay lines may be employed depending upon the number of bits per character.

The output transducers (not shown) associated with the delay lines 180 through 186 are connected to respective read circuits 190 through 196 shown within the dashed line box 19 in FIG. 6. The components of the read circuits 190 through 196 are the same and, therefore, only the components of the read circuit 190 are shown in detail. The read circuit 190 includes an amplifier 197 connected from the delay line 180 to the set input of a flip-flop 198. The general clear line 33 is connected to the reset input of the flip-flop 198. The one and the zero outputs of the flip-flop 198 are connected through respective amplifiers 199 and 200. The outputs of the amplifiers 199 and 200 are connected through respective lines 140 and 210 to the cable 20. Likewise, the one outputs of the read circuits 191 through 196 are connected through respective lines 141 through 146 to the cable 20, and the zero outputs are connected through respective lines 211 through 216 to the cable 20. The one outputs of the read circuits 190 through 196 are connected through the respective lines 140 through 146 and the cable 20 to the respective And circuits 120 through 126 in the input data gates in FIG. 4. This latter path provides the recirculation path for the delay lines 180 through 186. The one outputs of the read circuits 190 through 196 also are connected through the respective lines 140 through 146 and the cable 20 to respective output data gates 220 through 226 shown within the dash line box 24 in FIG. 5. The outputs of the gates 220 through 226 are connected to the output cable 25 which in turn may be connected to an output device. It is noted that the zero outputs of the read circuits 190 through 196 also may be connected through gates like the gates 220 through 226 to the output cable 25 if desired. Likewise, the zero outputs of the read circuits may be connected back to similar And circuits in the input data gates 13 in FIG. 4 if desired. The line 57 is connected to each of the output data gates 220 through 226 to condition these gates to pass the output data.

It now should be apparent that data is applied through the cable 10 to the core memory 11 in FIG. 4, and at particular times this data may be gated through the And circuits 110 through 116 and the Or circuits 130 through 136 to the respective write circuits 150 through 156 in FIG. 5. The write circuits 150 through 156 amplify this data and supply it to the respective delay lines 180 through 186 in FIG. 6 at clock time. The data propagates down the delay lines 180 through 186 and is sensed by read circuits 190 through 196 which in turn amplify this data and supply it back to the inputs of the And circuits 120 through 126 in FIG. 4 and to the gates 220 through 226 in FIG. 5. If the data is being recirculated, the And circuits 120 through 126 in FIG. 4 are conditioned to allow this recirculating data to pass to the respective Or circuits 130 through 136 and through the respective write circuits 150 through 156 back to the delay lines 180 through 186, respectively, in FIG. 6.

Turning now to the input data gates shown within the dash line box in FIG. 4, input control lines 40 through 43 are connected to the input data gates from the control circuit 30 in FIG. 7 which will be discussed subsequently. The lines 40 through 42 are connected to an Or circuit 230, the output of which is connected to an inverter 231. The input line 43 is connected to each of the And circuits 110 to 116. The output of the inverter 231 is connected through a line 233 to each of the And circuits 110 through 116. The input line 43 also is connected through an inverter 234 and a line 235 to each of the And circuits 120 through 126.

The input line 40 supplies a clear signal to cause the delay lines 180 through 186 in FIG. 6 to be cleared by deconditioning all of the And circuits 110 through 116 and 120 through 126. That is, when a clear signal is applied to the line 40, the And circuits 110 through 116 and the And circuits 120 through 126 do not allow data to pass to the delay lines 180 through 186. The input lines 41 and 42 supply signals to insert the respective special characters S1 and S2. When either of the lines 41 or 42 supplies such a signal, the And circuits 110 through 116 and 120 through 126 are deconditioned. The line 41 is connected to the Or circuits 130, 133, 134 and 136 to supply a binary character indicative of S1 to the delay lines 180 through 186. As illustrated in FIG. 4, the binary character is 1001101. The line 42 is connected to the Or circuits 130, 133, 134 and 135 to supply the binary character 1001110 indicative of S2 to the delay lines 180 through 186. When a signal is supplied on either the line 41 or 42 to insert either the character S1 or S2, the particular character is transferred through the write circuits 150 through 156 to the respective delay lines 180 through 186 while no data is allowed to enter the delay lines from the core memory 11 or to recirculate (since the And circuits 110 through 116 and 120 through 126 are deconditioned). Although the characters S1 and S2 have been described and illustrated as comprising certain binary bits, other combinations may be utilized. The particular binary numbers chosen for the characters S1 and S2 are two of the available unused I.B.M. 7070 tape characters.

The input line 43 to the input data gates 13 in FIG. 4 supplies a signal to the And circuits 110 through 116 to allow data characters to be transferred from the core memory 11 to the delay lines 17 in FIG. 6. The signal on the line 43 also is applied through the inverter 234 and the line 235 to the And circuits 120 through 126 to decondition these And circuits. When the And circuits 120 through 126 are deconditioned, data is not allowed to recirculate.

Figure 7:
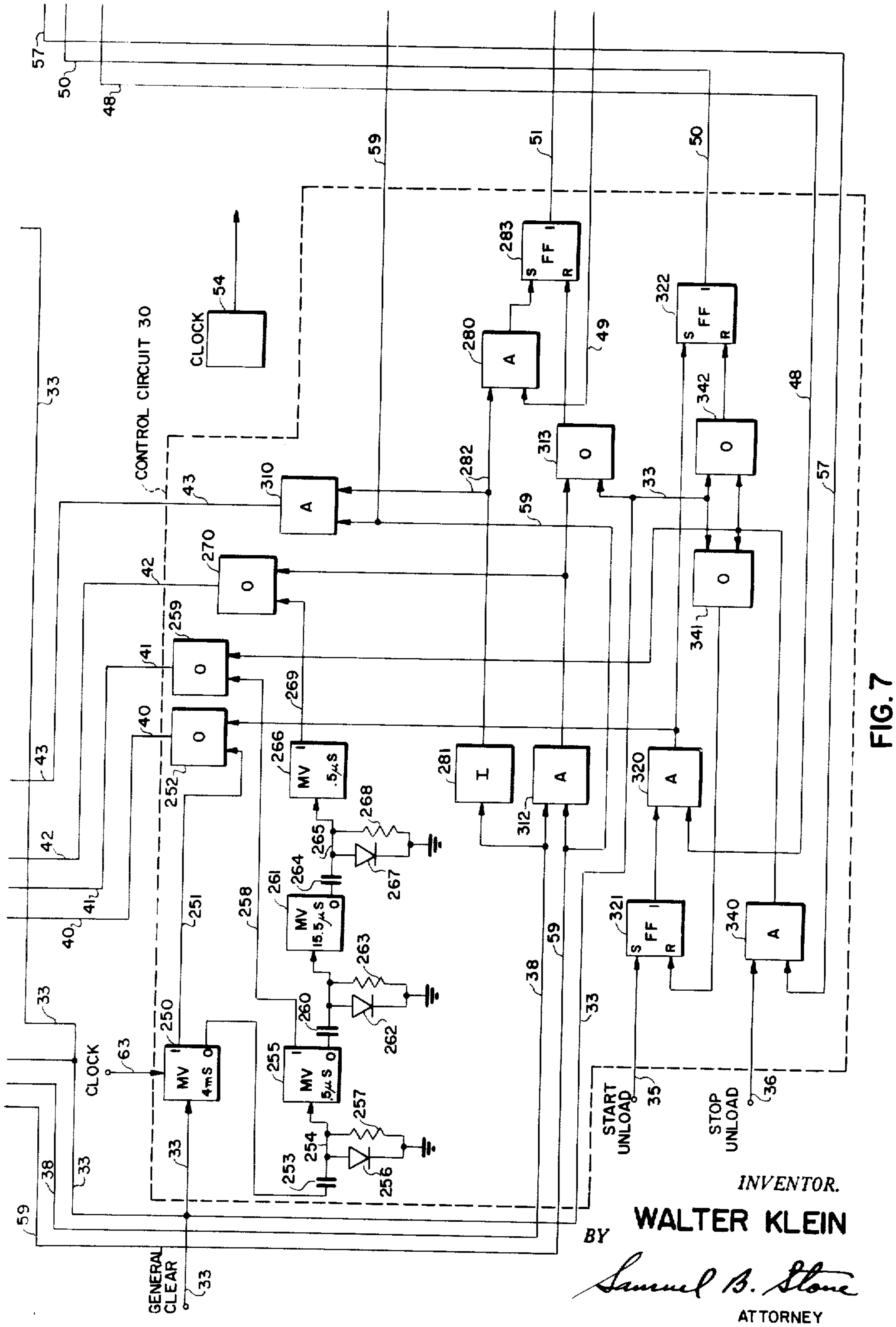

Turning now to the control circuit 30 shown in FIG. 7, the general clear line 33 is connected to a monostable multivibrator 250. The clock line 63 also is connected to the multivibrator 250 to insure that the multivibrator operates on clock, i.e., in synchronism with clock pulses. When the multivibrator 250 is operated, it provides a one output for four milliseconds. The one output of the multivibrator 250 is connected through a line 251 to an Or circuit 252. The signal supplied from the one output of the multivibrator 250 is the clear signal referred to earlier which is applied through the Or circuit 252 and the line 40 to the input data gates 13 in FIG. 4. The zero output of the multivibrator 250 is connected through a capacitor 253 and a line 254 to a monostable multivibrator 255 which provides a one output for one-half microsecond after it is set. The line 254 is connected to ground through a diode 256 and a resistance 257. The network including the capacitor 253, the diode 256 and the resistance 257 functions to supply the zero output of the multivibrator 250 to the input of the multivibrator 255 after the multivibrator 250 returns to its zero state, i.e., afer the four millisecond delay or at the fall of the one output.

The one output of the multivibrator 255 is connected through a line 258, on Or circuit 259 and the line 41 to the input data gates 213 in FIG. 4. The one output of the multivibrator 255 supplies a signal to cause the insertion of the special character S1 into the delay lines 17 in FIG. 6. The zero output of the multivibrator 255 is connected through a capacitor 260 to the input of a monostable multivibrator 261. The capacitor 260 also is connected to ground through a diode 262 and a resistance 263. The multivibrator 261 is set after a delay of one-half microsecond from the time the multivibrator 255 is set. The multivibrator 261 provides a delay of 15.5 microseconds. The zero output of the multivibrator 261 is connected through a capacitor 264 and a line 265 to the input of a monostable multivibrator 266. The line 265 also is connected to ground through a diode 267 and a resistance 268. Fifteen and one-half microseconds from the time the multivibrator 261 is set, the multivibrator 266 is set which in turn provides an output for one-half microsecond. The one output of the multivibrator 266 is connected through a line 269, an Or circuit 270 and the line 42 to the input data gates 13 in FIG. 4. Hence, the multivibrator supplies a signal to cause the insertion of the special character S2.

The multivibrators 250, 255, 261, and 266 in the control circuit 30 in FIG. 7 function upon the occurrence of a general clear pulse on the line 33 to initially clear the delay lines, insert the special character S1, and then insert the special character S2 a proper period of time after S1. The capacitor, diode, the resistance networks connected to the zero outputs of the multivibrators function to pass the output of one multivibrator to the next when the one output falls, i.e., after the delay period of the multivibrator. Upon the occurrence of a general clear pulse on the line 33 and a clock pulse on the line 63, the multivibrator 250 is set and provides an output on the line 251 for four milliseconds. After the four millisecond delay, the multivibrator 255 is set and provides an output on the line 258 for one-half microsecond. After the one-half microsecond delay, the multivibrator 261 is set and remains set for 15.5 microseconds. After the 15.5 microsecond delay of the multivibrator 261, the multivibrator 266 is set and provides an output on the line 269 for one-half microsecond. It is to be understood that this arrangement for providing properly timed control signals (clear, insert S1 and insert S2) is illustrative only, and a counter, a shift register or other suitable device may be employed for this purpose if desired. The requirements are that a clear pulse be supplied for at least the period of the delay lines (in the present illustration, 3.0065 milliseconds) in order to insure that all characters are cleared from the delay lines. After the delay lines are cleared, the special character S1 is inserted, followed by the insertion of the special character S2 after a predetermined period of time which is equal to the character spacing in the delay lines (in the present illustration 16 microseconds).

It now should be apparent that one purpose of the control circuit 30 in FIG. 7 is to initially clear the delay lines and to insert the special characters S1 and S2 in a proper spaced relationship. Assuming that the special characters S1 and S2 now are stored and recirculating in the delay lines, input data characters are stored in the delay lines by sensing the special character S2 and in turn causing the input data gates 13 in FIG. 4 to transfer data characters from the core memory 11 to the delay lines. This operation is accomplished by the S2 character gate 47, the input spacing counter 32 and the Or circuit 58 in FIG. 8 in combination with the control circuit 30 in FIG. 7.

Figure 8:
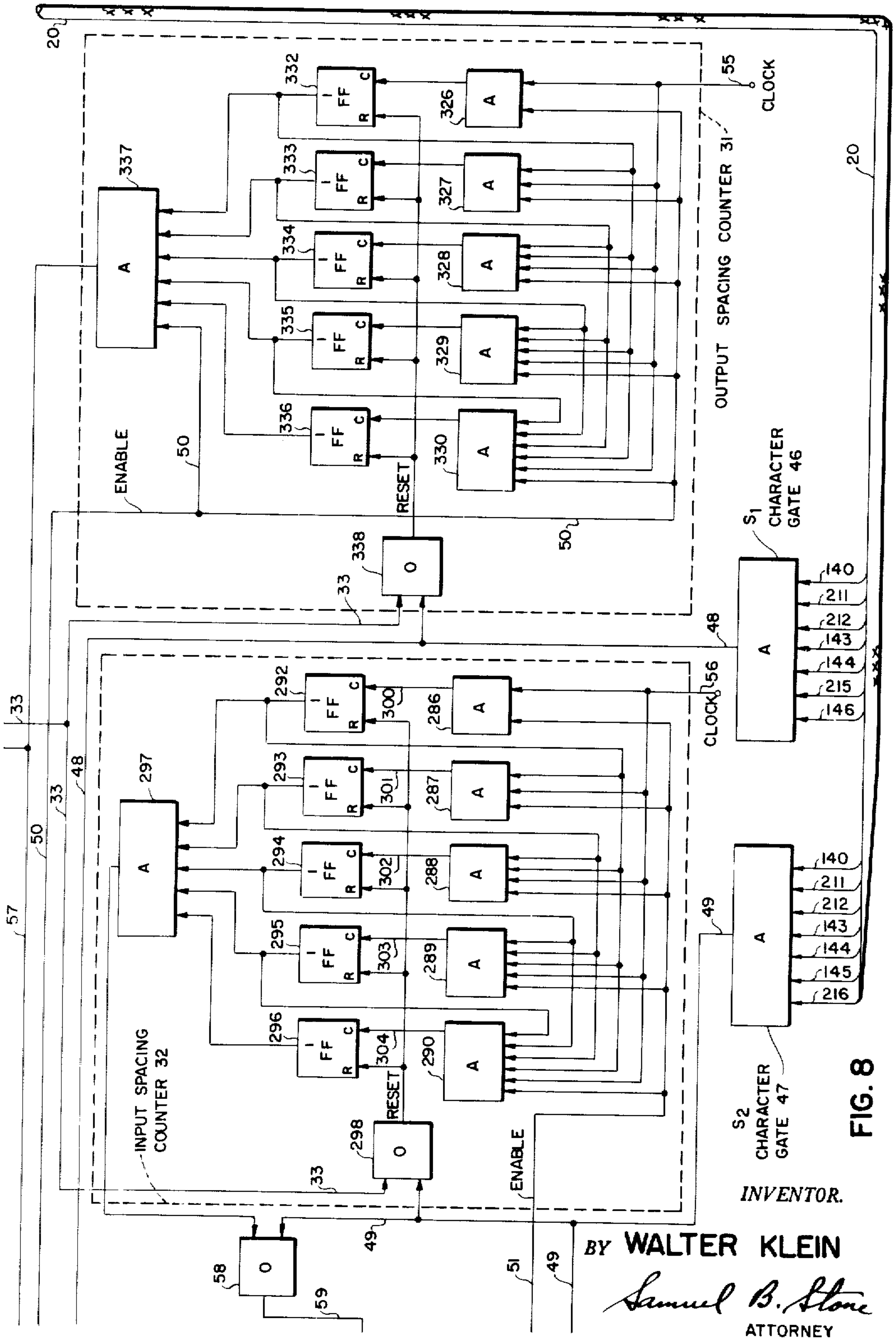

The necessary outputs of the read circuits 190 through 196 in FIG. 6 are connected to the S2 character gate 47 in FIG. 8. Since the S2 character that is chosen for illustration is 1001110, the lines 140, 211, 212, 143, 144, 145 and 216 are connected from the respective read circuits 190 through 196 through the cable 20 to the S2 character gate 47. The gate 47 supplies an output on the line 49 when the S2 character occurs at the outputs of the read circuits 190 through 196. This output on the line 49 is applied to reset the input spacing counter 32 as will be discussed subsequently. This output aslo is applied over the line 49 to an And circuit 280 in the control circuit 30 in FIG. 7. The memory empty line is connected from the core memory 11 in FIG. 4 through an inverter 281 and a line 282 to the input of the And circuit 280. The And circuit 280 provides an output when the S2 character gate senses the character S2 and the core memory contains data (is not empty). The output of the And circuit 280 is connected to the set input of a count enable flip-flop 283 which, when set, provides an output on the line 51 which enables the input spacing counter 32 in FIG. 8 to begin counting input clock pulses.

The input spacing counter 32 in FIG. 8 includes And circuits 286 through 290, flip-flops 292 through 296, And circuit 297 and an Or circuit 298 arranged (when enabled) to count input clock pulses on the clock line 56 from 0 through 31 and to provide an output from the And circuit 297 at the count of 31 (32 clock pulses). The clock input line 56 is connected to each of the And circuits 286 through 290. Also, the enable line 51 from the count enable flip-flop 283 in FIG. 7 is connected to each of the And circuits 286 through 290. The And circuits 286 through 290 operate in a conventional manner to provide an output signal upon the occurrence of particular input signals thereto. For example, when both of the inputs to the And circuit 286 are one's the output of the And circuit is a one. The outputs of the And circuits 286 through 290 are connected through respective lines 300 through 304 to the complement inputs of the flip-flops 292 through 296, respectively. The outputs of the flip-flops 292 through 296 are connected to the inputs of the And circuit 297. The output of the flip-flop 292 also is connected to each of the And circuits 287 through 290. The output of the flip-flop 293 is connected to the And circuits 288 through 290, the output of the flip-flop 294 is connected to the And circuits 289 and 290, and the output of the flip-flop 295 is connected to the And circuit 290. The flip-flops 292 through 296 are reset whenever a general clear signal is applied through the line 33 and the Or circuit 298 to the reset inputs of these flip-flops, or whenever the S2 character gate 47 provides an output through the line 49 and the Or circuit 298 to the reset inputs of these flip-flops.

Assuming that the flip-flops 292 through 296 have been reset, and that the count enable flip-flop 283 in FIG. 7 supplies an enable signal through the line 51 to each of the And circuits 286 through 290, the first clock pulse applied through the line 56 to the And circuit 286 causes this And circuit to supply an output which sets the flip-flop 292. The remaining And circuits 287 through 290 do not provide outputs at this time. When the flip-flop 292 is set, it provides a signal to the And circuit 287, and upon the occurrence of the second clock pulse on the line 56 the And circuit 287 provides an output to set the flip-flop 293. This second clock pulse also causes the And circuit 286 to provide an output which resets the flip-flop 292 since the flip-flops 292 through 296 are complementing type flip-flops and the inputs thereto from the respective And circuits 286 through 290 are applied to the complement inputs of these flip-flops. Although the output of the flip-flop 293 supplies a conditioning input to the And circuit 288, no conditioning input to this And circuit is supplied from the flip-flop 292 at this time.

Upon the occurrence of the third clock pulse on the line 56, the flip-flop 292 is again set. The flip-flop 293 remains set at this time since no conditioning input was supplied from the flip-flop 292 to the And circuit 287 when the third clock pulse occurred. At this time (flip-flops 292 and 293 are set) the flip-flop 292 supplies a conditioning input to the And circuits 287 through 290, and the flip-flop 293 supplies a conditioning input to the And circuits 288 through 290. Upon the occurrence of the fourth clock pulse, the flip-flop 294 is set, and the flip-flops 292 and 293 are reset. The operation of the counter 32 continues in a similar manner with the counter counting from zero through 31 sequentially as long as an enable signal is present on the line 51. Upon the occurrence of the thirty-second clock pulse (the clock pulse occurring when the flip-flops 292 to 296 are reset is taken as the first clock pulse), all the flip-flops 292 through 296 are set and providing a one output and, therefore, the And circuit 297 provides an output to the Or circuit 58. It now should be apparent that upon the occurrence of an S2 character the And circuit 47 provides an output on the line 49 which (assuming the core memory contains data) sets the count enable flip-flop 283 in FIG. 7 and resets the input spacing counter flip-flops 292 through 296 in FIG. 8. The input spacing counter 32 then counts clock pulses and provides an output at each count of 31 (upon the occurrence of the thirty-second clock pulse after the S2 character gate 47 provides an output).

In addition to commencing the operation of the input spacing counter 32 in FIG. 8, the ouput of the S2 character gate 47 is applied through the Or circuit 58 and the line 59 to an And circuit 310 in the control circuit 32 in FIG. 7, and to the core memory 11 in FIG. 4. The signal applied by the line 59 to the core memory 11 causes the read-out of the first data character from the core memory. The memory empty line 38 from the core memory 11 in FIG. 4 is connected through the inverter 281 in FIG. 7 also to the input of the And circuit 310. When the core memory contains data and the S2 character gate 47 provides an output, the And circuit 310 provides a signal on the line 43 to each of the And circuits 110 through 116 of the input data gates in FIG. 4. The signal on the line 43 conditions the And circuits 110 through 116 to allow the first data character to be transferred from the core memory 11 through the Or ciruits 130 through 136 and the write circuits 150 through 156 to the respective delay lines 180 through 186 in FIG. 6. The signal on the line 43 also is applied through the inverter 234 in FIG. 4 to the And circuits 120 through 126 to prevent the S2 character from being recirculated in the delay lines. Hence, the S2 character is replaced in the delay lines by the first data character.

It is assumed in the illustrative embodiment of the present invention that only that amount of data is stored in the core memory 11 that is to be stored in the delay lines at any given time. If, for example, only one data character was stored in the core memory 11, the memory empty line 38 would now supply a signal indicating that the core memory 11 is empty. This signal would decondition the And circuit 310 in FIG. 7. The And circuit 310 would decondition the And circuits 110 through 116 in the input data gates in FIG. 4. Since the ouput from the Or circuit 58 in FIG. 8 is applied through the line 59 to an And circuit 312 in FIG. 7, this And circuit is conditioned at the next count of 31. Therefore, the And circuit 312 provides an output through an Or circuit 313 to reset the count enable flip-flop 283 which in turn stops the counting operation of the input spacing counter 32. The general clear line 33 also is connected to the Or circuit 313 to initially reset the flip-flop 283 when the buffer operation is begun. The output of the And circuit 312 also supplies a signal through the Or circuit 270 and the line 42 to the input data gates 13 in FIG. 4 to reinsert the special character S2. Hence, the character S1, the first data character and the character S2 are recirculating in the delay lines at this time.

If more than one data character had been stored in the core memory 11 in FIG. 4, a character would be supplied to the write circuits 15 in FIG. 5 and in turn to the delay lines 17 in FIG. 6 at each count of 31 of the input spacing counter 32. In other words, as long as data is present in the core memory 11 the Or circuit 58 in FIG. 8 supplies an ouput on the line 59 at each count of 31 of the input spacing counter 32 to the core memory 11 in FIG. 4 to read out data characters, and a signal through the And circuit 310 in FIG. 7 and the line 43 to the input data gates 13 in FIG. 4 to allow the transfer of these characters to the delay lines. After the last data character is transferred from the core memory 11 to the delay lines, the S2 character is reinserted into the delay lines at the next count of 31 of the input spacing counter 32.

It now should be apparent how data is transferred from the memory 11 into the delay lines 17 in FIG. 6. The S2 character is sensed by the S2 character gate 47 in FIG. 8 and the first data character is inserted in place of the S2 character. The input spacing counter 32 in FIG. 8 is enabled and commences counting clock pulses and provides outputs at every count of 31. Upon the occurrence of each count of 31, a signal is supplied to the core memory 11 to read out a data character, and a signal is supplied to condition the And circuits 110 through 116 in the input data gates 13 in FIG. 4 to transfer this data character to the delay lines 17 in FIG. 6. After the last data character is transferred from the core memory 11, a memory empty signal from the core memory 11 together with a signal indicating a count of 31 of the input spacing counter 32 causes the S2 character to be reinserted into the delay lines.

Assuming that a certain number of data characters is recirculating in the delay lines along with the special characters S1 and S2, data is read from the sequential buffer by sensing the S1 character and applying a start-unload signal to the input line 35 connected to the control circuit 30 in FIG. 7. Certain outputs from the read circuits 190 through 196 in FIG. 6 are connected to the S1 character gate 46 in FIG. 8. Since the S1 character chosen for illustration is the binary number 1001101, the lines 140, 211, 212, 143, 144, 215 and 146 are connected from the respective read circuits 190 through 196 in FIG. 6 to the S1 character gate 46 in FIG. 8. Upon the occurrence of the S1 character, the And circuit 46 supplies an output on the line 48 to an And circuit 320 in the control circuit 30 in FIG. 7. The start-unload line 35 in FIG. 7 is connected to the set input of a flip-flop 321, the output of which is connected to the And circuit 320. The output of the And circuit 320 is connected to the set input of a count enable flip-flop 322. The output of the count enable flip-flop 322 is connected through the line 50 to And circuits 326 through 330 in the output spacing counter 31 in FIG. 8.

The output spacing counter 31 also includes flip-flops 332 through 336, an And circuit 337 and an Or circuit 338. The enable line 50 also is connected to the And circuit 337. The output from the S1 character gate 46 is connected through the line 48 and the Or circuit 338 to the reset inputs of each of the flip-flops 332 through 336. The general clear line 33 also is connected through the Or circuit 338 to the reset inputs of the flip-flops 332 through 336. The And circuits 326 through 330 and the flip-flops 332 through 336 in the output spacing counter 31 are interconnected and operated in the same manner as the equivalent And circuits and flip-flops in the input spacing counter 32 in FIG. 8. Hence, after the output spacing counter 31 in FIG. 8 has been reset by a signal on the line 48 and enabled by a signal on the line 50, it responds to clock pulses on the line 55 to count sequentially from zero through thirty-one. The outputs from the flip-flops 332 through 336 are connected to the And circuit 337 which in turn provides an output at the count of 31 when an enable signal is present on the line 50. The output of the And circuit 337 is connected through the line 57 to condition the output data gates 220 through 226 in FIG. 5. The reason for also connecting the enable line 50 as an input to the And circuit 337 is to prevent a conditioning signal from being applied to the output data gates 220 through 226 when the S1 character is available at the inputs of these gates.

Turning again to the control circuit 30 in FIG. 7, the output of the And circuit 320 in addition to being connected to the count enable flip-flop 322 for the output spacing counter 31 also is connected through the Or circuit 252 and the line 40 to the input data gates 13 in FIG. 4. Hence, when the And circuit 320 supplies an output to set the count enable flip-flop 322, it also supplies a signal to the input data gates 13 to decondition the And circuits 110 through 116 and 120 through 126 to prevent the character S1 from being supplied back to the delay lines 17 in FIG. 6. It should be noted that the output data gates 24 in FIG. 5 are conditioned only at a count of 31 from the output spacing counter 31 in FIG. 8 since the characters are read out in the same sequence as they are entered. In other words, after a start-unload signal has been applied to the line 35 in FIG. 7, a character is read out from the sequential buffer at each count of 31. As noted previously, all data characters continue to recirculate until new data is entered into the delay lines.

After the desired number of characters (one, a few or all) have been read from the delay lines, a stop-unload signal is applied to the line 36 in FIG. 7. This line 36 is connected to an And circuit 340. The output from the And circuit 337 in the output spacing counter 31 in FIG. 8 also is connected to the And circuit 340 by the line 57. The output of the And circuit 340 is connected to Or circuits 341 and 342 which in turn are connected to the reset inputs of the respective flip-flops 321 and 322. The general clear line 33 also is connected to the Or circuits 341 and 342 to initially reset the flip-flops 321 and 322 when the buffer operation is begun. The output of the And circuit 340 also is connected through the Or circuit 259 and the line 41 to the input data gates 13 in FIG. 4.

When a stop-unload signal is applied to the line 36 and upon the occurrence of a count 31 from the output spacing counter 31, the And circuit 340 provides an output through the Or circuits 341 and 342 to the respective flip-flops 321 and 322 to reset these flip-flops. When the flip-flop 322 is reset, the output spacing counter 31 no longer is enabled to count input clock pulses. The output of the And circuit 340 also causes the reinsertion of the special character S1 in the delay lines 17 in FIG. 6 by applying a signal through the Or circuit 259 and the line 41 to the Or circuits 130, 133, 134 and 136 in the input data gates 13 in FIG. 4. Hence if all data characters have been read from the delay lines, the special characters S1 and S2 continue to recirculate in the delay lines spaced 16 microseconds apart as shown in FIG. 2*a* (the data read out also continues to recirculate as discussed previously). If all the data characters have not been read from the delay lines, the data remaining to be read out is preceded by the special character S1 and followed by the special character S2 as discussed previously. If data remains to be read out, it may be read out subsequently by applying a start-unload signal to the line 35 in FIG. 7 as discussed above.

It now should be apparent that once data characters have been stored in the delay lines 17 in FIG. 6, one or more data characters may be read from the delay lines by applying a start-unload signal to the line 35 in FIG. 7 and sensing the S1 character with the S1 character gate 46 in FIG. 8. The S1 character gate 46 supplies a signal to the And circuit 320 in FIG. 7. The start-unload signal sets the flip-flop 321 which in turn supplies an input to the And circuit 320. The output of the And circuit 320 supplies a signal to the input data gates 13 to clear the S1 character, and supplies a signal to set the count enable flip-flop 322 in FIG. 7. The count enable flip-flop 322 supplies an enabling signal to the output spacing counter 31 which enables this counter to commence counting clock signals. Upon the occurrence of the first count 31 the output data gates 24 in FIG. 5 are conditioned to pass the first data character from the delay lines. Data characters continue to be read out at each count 31 as long as the stop-unload signal is not applied to the line 36 in FIG. 7. When a stop-unload signal is applied to the line 36 in FIG. 7, the character S1 is reinserted into the delay lines and the count enable flip-flop 322 is reset upon the occurrence of the next count 31 from the output spacing counter 31 in FIG. 8.

The clock 54 is illustrated in FIG. 7. The clock 54 is not shown connected to the various logical components throughout the numerous figures to avoid cluttering the drawings with unnecessary lines. It is well understood to those skilled in the art that generally a clock or source of timing pulses is connected to various logical components to assure synchronous operation thereof. Also to insure synchronous operation of all of the components of the sequential buffer, the output of the clock 54 is Anded with both the set and reset inputs of all flip-flops. Such construction is well known to those skilled in the art, and for simplicity of illustration, such a connection has been shown only for the flip-flop 169 in the write circuit 150 in FIG. 5. Note that the clock line 64 is connected to the And circuits 167 and 170, and therefore, the inputs to these And circuits from the respective Or circuit 130 and the inverter 160 cause these And circuits to provide outputs only at clock time.

As discussed previously, assume that each delay line has a length of 3,006.5 microseconds, a 2 megacycle pulse repetition rate, one-half microsecond per bit, 16 microseconds spacing between bits and a useful capacity of 6,013 bits. The capacity is derived by multiplying the bit spacing (which is based on the desired output rate) times an integer number (which may be any number as desired to get the desired capacity) and subtracting 3 from the product. The number 3 is subtracted since the special characters S1 and S2 subtract 2 bits from the useful capacity of each delay line, and a 1 is subtracted (or added, if desired) to provide interlacing of bits. The bit capacity required for a particular line depends upon the spacing of the bits therein. The required bit capacity, C, can be stated mathematically as follows:

$$C=X\cdot K-1 \qquad (1)$$

where X is the bit spacing assuming a fixed spacing and, therefore, a fixed output rate for the sequential buffer. K is an integer number which may be any integer number to provide the desired capacity; the 1 is subtracted to provide interlace; and the data character capacity is reduced by two if two special characters are employed. Hence, in the buffer illustrated in FIGS. 4 through 8, Equation (1) becomes:

$$\begin{aligned} C&=32\times 188-1 \\ &=6016-1 \\ &=6015 \end{aligned}$$

The data bit capacity of each line is further reduced by two (2) since two special characters S1 and S2 are employed. Thus, the data bit capacity is 6013. It should be apparent that a different capacity or a different spacing can be provided by employing Equation (1) above.

If more than one output rate is desired the above Equation (1) becomes:

$$C=X_1\cdot X_2\cdot X_3 \ldots X_n\cdot K-1 \qquad (2)$$

where $X_1$ through $Y_n$ are the equivalent bit spacings for the desired fixed rates. The lowest, or minimum, bit capacity, $C_m$ is then equal to the lowest common multiple of the bit spacings $-1$, since for minimum capacity the constant K would be chosen as 1. In other words, for fixed output rates of 62.5 kc., 40 kc. and 10 kc., for example, the equivalent time spacings between bits (or characters) are 16 microseconds, 25 microseconds and 100 microseconds, respectively. These time spacings correspond respectively to bit spacings of 32, 50 and 200 where a bit occupies one-half microsecond. Substituting in Equation (2) above, C is equal to the lowest common multiple of 32, 50 and 200 times $K-1$. The lowest common multiple of these three numbers is $2\times2\times2\times2\times2\times5\times5=800$. Hence, the minimum capacity line that could be utilized to provide the three above output rates would have a bit capacity of 799 bits (800−1) where K is taken equal to 1. It is only necessary to arrange the input and output spacing counters (which are conventional counters) to count to 32, 50 and 200 (or zero through 31, zero through 49 and zero through 199). Hence, by utilizing delay lines of a particular capacity and providing input and output spacing counters that can selectively supply outputs at predetermined different counts, the sequential buffer can provide more than one fixed output rate as well as provide an asynchronous output rate of zero up to 1 divided by the length of the line.

Although the operation of the sequential buffer shown in FIGS. 4 through 8 has been discussed generally in connection with a discussion of the components shown in these figures, it is believed that a discussion of the sequence of operation at this point may be helpful. In order to initiate operation of the sequential buffer, a general clear pulse is applied to the line 33 in FIG. 7. This pulse clears the core memory 11, resets all flip-flops, and sets the monostable multivibrator 250 in the control circuit 30 which in turn prevents any data from being entered into the delay lines 17 in FIG. 6 for a period of 4 milliseconds. After the core memory 11 has been cleared, data may be entered therein by supplying data on the input data cable 10 and by applying a load signal on the line 34. In the meantime the multivibrators 255, 261 and 266 operate to insert the special characters S1 and S2 into the delay lines in the proper time spaced relationship. The sequential buffer now is ready for the transfer of data from the core memory 11 to the delay lines 17 in FIG. 6.

The memory empty line 38 connected from the core memory 11 in FIG. 4 supplies a signal indicating that data has been entered into the core memory 11 and, therefore, upon the occurrence of the S2 character at the input of the S2 character gate 47 in FIG. 8 the first data character is substituted for the S2 character. It should be noted at this point that the entry of data from the core memory into the delay lines is automatically under the control of the core memory 11. That is, when data is entered into the core memory 11, the sequential buffer starts the transfer of this data to the delay lines when the S2 character is sensed. This particular operation is illustrated since it is assumed that the equipment associated with the sequential buffer will supply data to the core memory when it is desired that it should be stored in the delay lines. If a different operation is desired, an external command signal can be supplied on the line 38 instead of relying on the memory signal from the core memory 11.

Data characters are sequentially entered into the delay lines 17 in FIG. 6 from the core memory 11 each time the input spacing counter 32 in FIG. 8 reaches a count of 31, and this entry of data continues as long as data is available from the core memory 11. By the choice of particular capacity delay lines and the spacing of data therein, the data is interlaced in the delay lines to utilize the full capacity thereof.

Assuming that data is now recirculating in the delay lines 17 in FIG. 6, one or more data characters may be read out by applying a start-unload-unload signal to the line 35 in FIG. 7. When the S1 character is received by the S1 character gate 46 in FIG. 8, the output spacing counter 31 is reset and subsequently enabled to commence counting input clock pulses thereto. Also, the S1 character is removed from the delay lines. At each count of 31 from the output spacing counter 31 in FIG. 8 the output data gates 220 through 226 in FIG. 5 are conditioned to read out the characters to an output device at a fixed rate. If desired, the output rate of the sequential buffer may be made asynchronous from zero to 1 divided by the length of the delay lines by applying start-unload and stop-unload signals to the respective lines 35 and 36 in FIG. 7 at the desired times to achieve the lower asynchronous read out rates. After the desired amount of data has been read from the sequential buffer, a start-unload signal is applied to the line 36 in FIG. 7 and upon the next count of 31 from the output spacing counter 31 in FIG. 8, the S1 character is reinserted into the delay lines and the output spacing counter 31 is disabled so that it ceases counting input clock pulses.

As noted previously, by utilizing delay lines of particular capacity in accordance with Equation (2) above and by utilizing input and output spacing counters which may selectively count to different numbers and therefore provide different spacings of characters, different synchronous output rates may be provided selectively. Data then may be read into the delay lines at selected rates, which rates determine the output rates of the delay lines.

The And circuits, the Or circuits, the monostable multivibrators, flip-flops, gates and inverter circuits employed in the illustrative large capacity sequential buffer of the present invention may be any one of various suitable types, and a detailed consideration of them is not considered necessary since they are quite widely known.

The write circuit 150 shown in block diagram form in FIG. 5 is illustrated schematically in FIG. 9. As noted previously, the remaining write circuits 151 through 156 in FIG. 5 are identical to the write circuit 150. The set input line 137 (which is connected from the Or circuit 130 in the input data gates in FIG. 4) is connected to one input of the And circuit 167. The And circuit 167 includes two diodes 360 and 361, and a resistance 362. The set input line 137 is connected to the diode 360, and the clock input line 64 is connected to the diode 361. One terminal of the resistance 262 is connected to the diodes 360 and 361, and the other terminal of the resistance 362 is connected to a line 363 which is connected to a negative potential source (not shown). The And circuit 167 is connected through a line 364 and a diode 365 to the base of a transistor 366. The transistor 366 and its associated biasing resistances 367 through 369 comprise the amplifier 168 shown in block form in FIG. 5.

The And circuit 170 includes diodes 370 and 371, and a resistance 372. The clock line 64 is connected to the diode 370, and the reset line 138 is connected to the diode 371. One terminal of the resistance 272 is connected to the diodes 370 and 371, and the other terminal thereof is connected to the line 363. The output of the And circuit 170 is connected through a line 373 to the Or circuit 171. The Or circuit 171 includes two diodes 374 and 375. The line 373 is connected to the diode 374, and the general clear line 33 is connected through a resistance 376 to the diode 375. The output of the Or circuit 171 is connected through a line 377 to the base of a transistor 378. The transistor 378 and its associated biasing resistances 379 through 381 comprise the amplifier 172 shown in block form in FIG. 5. The biasing resistances 367, 368, 379 and 380 are connected to a line 383 which is connected to a positive potential source (not shown).

The emitters of the transistors 366 and 378 are connected to the respective set and reset inputs of the flip-flop 169. The flip-flop 169 is a power flip-flop and includes two transistors 385 and 386 which function as the bistable elements thereof, and two transistors 387 and 388 which are connected as emitter followers to provide a substantially high current from the flip-flop. The emitter of the transistor 366 is connected through a diode 390 and a parallel RC network 391 to the base of the transistor 385. The emitter of the transistor 378 is connected through a diode 394 and a parallel RC network 395 to the base of the transistor 386. The bases of the transistors 385 and 386 are connected through respective resistances 398 and 399 to the positive potential line 383. The emitters of the transistors 385 and 386 are grounded, and the collectors are connected through respective resistances 400 and 401 to the negative potential line 363. The collectors of the transistors 385 and 386 also are connected through respective diodes 404 and 450 to the emitters of the transistors 387 and 388, respectively. The base of the transistor 385 is connected through the RC cir- nected through respective diodes 404 and 405 to the emitter of the transistor 388. Likewise, the base of the transistor 386 is connected through the RC network 395, a diode 409 and a resistance 410 to the emitter of the transistor 387. The bases of the transistors 385 and 386 also are connected to the respective emitters of the transistors 388 and 387 through capacitors 412 and 413, respectively.

The base of the transistor 387 is connected to ground through a diode 415, and the base of the transistor 388 is connected to ground through a diode 416. The collectors of the transistors 387 and 388 are connected through respective resistances 417 and 418 to the negative potential line 363. The collectors of the transistors 387 and 388 also are connected through respective capacitances 419 and 420 to ground. The emitter of the transistor 387 is connected through a parallel RC network 422 to one terminal of a write head 423. The network 422 is employed to match the delay line to the write circuit and to improve the current rise time of the write signal. This network may be omitted if desired. The emitter of the transistor 388 is connected to the other terminal of the write head 423. The write head 423 is connected with one of the delay lines 17, such as the delay line 180 in FIG. 6, to store data therein. The lines 363 and 383 are connected through respective capacitances 425 and 426 to ground.

The write circuit shown in FIG. 9 functions to supply powerful high rise time current signals to the write head 423 coincident with clock pulses. The no-return-to-zero method of recording is provided by the write circuit shown in FIG. 9 in order to fully utilize the capacity of the delay lines. The non-return-to-zero method of recording is well known to those skilled in the art, and is a method whereby changes in writing current occurs only when there is a change in the information to be stored. In other words, when a binary 1 follows a binary 0, or vice versa, the writing current changes (in polarity), but as long as all 1's or all 0's occur, the writing current does not change. This will be better understood by considering the operation of the write circuit in FIG. 9.

Assume first that a general clear pulse is applied to the line 33. This clear pulse is applied through the resistance 376, the diode 375 and the line 377 to the base of the transistor 378. The transistor 378 provides a signal through the diode 394 and the RC network 395 to the base of the transistor 386 in the flip-flop 169. The signal on the base of the transistor 386 turns on this transistor thereby resetting the flip-flop 169. The transistor 387 is biased so that it turns on when the transistor 386 is turned on, and the transistor 388 is biased so that it turns on when the transistor 385 turns on. When the transistor 386 is turned on a current path exists through the emitter-collector path of the transistor 386, the diode 405, the write head 423, the RC circuit 422, the emitter-collector circuit of the transistor 387 and the resistance 417 to the negative potential line 363. Hence, the transistor 387, which is connected as an emitter-follower, supplies a high current through the write head 423. The transistor 388 does not turn on when the transistor 386 is turned on because at this time the emitter of the transistor 388 is substantially at ground potential.

When a set input is applied to the line 137 and a clock pulse is applied to the line 64, the And circuit 167 provides an output signal through the diode 365 to the base of the transistor 366. The transistor 366 provides a signal through the diode 390 and the RC network 391 to turn on the transistor 385. When the transistor 385 turns on, the transistor 387 turns off (its emitter now is substantially at ground) and the transistor 386 is turned off through the circuit including the resistance 410, the diode 409 and the RC network 395. The flip-flop 169 now is in its set state, and a current path exists through the emitter-collector circuit of the transistor 385, the diode 404, the RC network 422, the write head 423, the transistor 388 (which now is on) and the resistance 418 to the negative potential line 363. Hence, current exists in the write head 423 in a direction opposite to that when the flip-flop 169 was in the reset state. As long as set signals (one's) are applied to the line 137 the flip-flop 169 remains set. When a reset signal (a one) is applied to the line 138, the flip-flop 169 is reset and, therefore, the current in the write head 423 changes direction. Consequently, the current in the write head 423 changes direction only when the input to the write circuit in FIG. 9 is changed from 1 to 0, or vice versa. Note that the input applied to the line 137 is the inverse of that applied to the line 138.

The read circuit 190 shown in block diagram form in FIG. 6 is illustrated schematically in FIG. 10. As noted previously, the remaining circuits 191 through 196 in FIG. 6 are identical to the read circuit 190. The read circuit shown in FIG. 10 includes a pulse amplifier 197 which also functions to shape the incoming signal, a bistable flip-flop 198 and output amplifiers 199 and 200. A read transducer 330 which is connected at the opposite end of the delay line from the write transducer has one terminal connected to the base of a transistor 331. The other terminal of the read head 330 is connected to ground. A capacitance 332 and a resistance 333 are connected across the read transducer 330. The pulse amplifier and shaper 197 includes the transistor 331 and transistors 335 through 337. The collector of the transistor 331 is connected through a capacitor 340 to the base of the transistor 335. The collector of the transistor 335 is connected through a capacitor 342 to the base of the transistor 336. The collector of the transistor 336 is connected through a capacitor 344 and clipping diodes 345 and 346 to the base of the transistor 337. The general clear line 33 is connected through a diode 347 to the base of the transistor 337. Biasing resistors and by-pass capacitors are connected with the transistors 331 and 335 through 337 to ground, the negative potential line 363 and the positive potential line 383 in a conventional manner. Hence, the pulse amplifier and shaper 197 functions to amplify and shape the signals supplied by the read head 330. The diodes 345 and 346 function to clip the signals to eliminate over-shoot, clutter, etc.

The flip-flop 198 includes two transistors 350 and 351 connected in a conventional manner. The emitter of the transistor 337 is connected through a resistance 352 to the base of the transistor 351. The collector of the transistor 351 is connected through a parallel RC network 353 to the base of the transistor 350. Likewise, the collector of the transistor 350 is connected through a RC network 354 to the base of the transistor 351. The emitters of the transistor 350 and 351 are connected through a resistance 355 to ground, and the collectors of these transistors are connected through respective resistances 356 and 357 to the negative potential line 363.

The amplifiers 199 and 200 include respective transistors 360 and 361. Connected with the transistors are resistance, capacitance, and diode networks which keep the transistors out of saturation and provide for fast operation of the amplifiers. The collector of the transistor 350 in flip-flop 198 is connected through an RC circuit 362 and a diode 363 to the base of the transistor 360. The collector of the transistor 351 is connected through a RC circuit 364 and a diode 365 to the base of the transistor 361. The collector of the transistor 360 is connected to the output one line 140, and the collector of the transistor 361 is connected to the output zero line 210.

The signal from the read transducer 330 is amplified and shaped by the pulse amplifier and shaper 197. Also the signal is clipped by the diodes 345 and 346. One diode clips positive signals and the other diode clips the negative signals. The output of the pulse amplifier and shaper 197 is applied from the emitter of the transistor 337 through the resistance 352 to the base of the transistor 351 in the flip-flop 198. The flip-flop 198 is bistable and is triggered whenever the read current in the read transducer 330 changes from one direction to the other, i.e., the flip-flop 198 normally remains in one state (for example, the zero or reset state) when the current in the read transducer 330 is in one direction and is triggered to the opposite state (for example, the one or set state) when the current in the read transducer 330 changes to the opposite direction. When the flip-flop 198 is in the zero state, for example, the transistor 351 is on and a signal is applied to the base of the transistor 361 which in turn provides an output at the collector thereof on the line 210 indicative of a zero. When the flip-flop 198 is in the one state, the transistor 350 is on and a signal is supplied to the base of the transistor 360 which provides an output at its collector on the line 140 indicative of a one. Hence, the read circuit shown in FIG. 10 operates in the non-return-to-zero mode to provide an output on the line 140, for example, whenever one's are detected by the read head 330, and to provide an output on the line 210 when the read head 330 senses zeroes. Note that the output on the line 140 and 210 do not change with each bit in the non-return-to-zero mode but only change when there is a change from one to zero, or vice versa, detected by the read transducer 330. That is, as long as all one's are detected by the read transducer 330 the output line 140 provides a constant output and does not return to zero between each one bit. When all zeroes are detected by the read transducer 330, the output line 210 provides a similar output. By utilizing the non-return-to-zero method of recording twice the amount of information may be stored in the delay lines 17 in FIGS. 6 over what could be stored therein by utilizing the return-to-zero method of recording since the signals do not return to zero between each successive bit but only return to zero when there is a change from binary one to binary zero, or vice versa.

It now should be apparent that the present invention provides a large capacity sequential buffer which utilizes cyclic memory devices for the main storage capacity thereof and which utilizes a small memory to hold data during the access time of the cyclic memory devices. The entire sequential buffer has the equivalent characteristics of a sequential core memory. Addressing of data is not required since data is read into or from the sequential buffer by sensing special characters to enable the read-in or read-out of data. The full capacity of the cyclic memory devices is utilized by interlacing data therein. The input to the sequential buffer is asynchronous and the output thereof is synchronous at a fixed rate with asynchronous output capabilities for a short range of output rates. The output of the sequential buffer may be synchronous at one or more desired rates.

What is claimed is:

1. A large capacity sequential buffer having an input for receiving data at an asynchronous rate and an output for supplying data at one or more synchronous rates, the improvement comprising a static memory connected with said input for receiving and storing said data at an asynchronous rate, a dynamic memory for receiving and storing data, first means connected with said static memory and with said dynamic memory for selectively applying data from said static memory to said dynamic memory in a predetermined spaced relationship, second means connected with said dynamic memory and said first means whereby said first means selectively supplies the output of said dynamic memory back to the input thereof to recirculate data through the dynamic memory, third means connected with said second means for selectively applying data from said dynamic memory to said output, fourth means connected with said first means for controlling the transfer of information from said static memory to said dynamic memory and for causing the insertion of first and second special characters in said dynamic memory, fifth means connected with said second means and said fourth means to sense said second special character stored in said dynamic memory to control said fourth means to cause said transfer of information from said static memory to said dynamic memory and to cause reinsertion of said second character in said dynamic memory, and sixth means connected with said second, third and fourth means to sense said first special character stored in said dynamic memory for controlling the application of data from said dynamic memory to said output by said third means and for controlling said fourth means to reinsert said first special character in said dynamic memory.

2. A sequential buffer as in claim 1 wherein
said static memory is a small capacity magnetic memory, and
said dynamic memory is a large capacity memory including a plurality of cyclic memories.

3. A sequential buffer as in claim 2 wherein
said cyclic memories comprise magnetostrictive delay lines.

4. A sequential buffer as in claim 2 wherein
the data applied from said magnetic memory to said dynamic memory is interlaced in said dynamic memory.

5. A large capacity sequential buffer having the characteristics of an equivalent capacity sequential core buffer including an input for receiving data and an output for applying data to an output device, the improvement comprising
a small core memory connected with said input,
a plurality of cyclic memories,
first means for selectively connecting the output of said core memory to said cyclic memories,
second means for connecting the outputs of said cyclic memories to said first means,
third means connected with said second means to apply the outputs of said cyclic memories to the output of said sequential buffer, and
control means, including a control circuit interconnected with special character gates and input and output data spacing counters, connected with said core memory and said first, second and third means for causing the insertion of first and second special characters into said plurality of cyclic memories, for sensing said second special character stored in said cyclic memories and controlling the transfer of data from said core memories to said cyclic memories at a predetermined rate and the reinsertion of said second special character after the last item of transferred data, and for sensing the first special character stored in said cyclic memories and controlling the transfer of data from said cyclic memories through said third means to the output of said sequential buffer at a like rate and the reinsertion of said first special character in said cyclic memories after the transfer of the last item of data to the output of said sequential buffer.

6. A large capacity sequential buffer having the characteristics of an equivalent capacity sequential core buffer including an input for receiving data at an asynchronous rate and an output for applying data to an output device at one or more synchronous rates, the improvement comprising
a storage device connected with said input for storing data received at said input,
a plurality of cyclic memories,
input data gates connected between the storage device and said cyclic memories for selectively applying data stored in said storage device to said cyclic memories,
recirculation means for connecting the outputs of said cyclic memories to said input data gates for selectively connecting the outputs of said cyclic memories with the inputs thereof,
output data gates connected with said recirculaion means and the output of said sequential buffer for selectively applying the outputs of said cyclic memories to an output device,
a control circuit connected with said storage device and said input data gates to control the transfer of data from said storage device to said cyclic memories and to control the insertion of first and second spacial characters in said cyclic memories, said first and second special characters respectively serving to indicate the start and end of data stored in said cyclic memories,
input data control means connected with said recirculation means for sensing said second special character stored in said cyclic memories and connected with said control circuit for causing the transfer of data from said storage device to said cyclic memories at a predetermined rate and for causing the reinsertion of said second special character following the last item of data transferred, and
output data control means connected with said recirculation means for sensing said first special character stored in said cyclic memories and connected with the output data gates and the control circuit for enabling said output data gates to transfer data from said cyclic memories to said output, and for causing said control circuit to reinsert said first special character upon the completion of the transfer of data from said cyclic memories to said output.

7. A large capacity sequential buffer as in claim 6 wherein
said input data control means and said control circuit function to control said storage device and said input data gates to supply data from said storage device to said cyclic memories at one or more predetermined rates,
said data is interlaced in said cyclic memories, and
said output data control means control said output data gates to supply data to said output device at said one or more predetermined rates.

8. A large capacity sequential buffer as in claim 7 wherein
said control circuit controls said input data gates to insert said first and second special characters at a predetermined rate into said cyclic memories,
said input data control means senses the second of said characters to operate said control circuit when said storage device contains data whereby said control circuit controls said input data gates to transfer data from said storage device to said cyclic memories at a predetermined rate until said storage device is empty whereupon said control circuit and said input data gates reinsert said second special character into said cyclic memories, and
said output data control means applies a control signal to enable said output data gates a predetermined time after it senses the first of said special characters and applies a command signal to said control circuit whereby said output data control means controls said output data gates to read out data at said predetermined rate.

9. A large capacity sequential buffer as in claim 8 wherein
said cyclic memories comprise magnetostrictive delay lines.

10. A sequential buffer including an input for receiving data at an asynchronous rate and an output for applying data to an output device at one or more synchronous rates, the improvement comprising
a storage device having an input connected with said input and having an output,
a plurality of cyclic memories having inputs and outputs,
first means for selectively connecting the output of said storage device to the inputs of said cyclic memories, said storage device serving to store said data during the access time of said cyclic memories,
second means connected with said cyclic memories for applying the outputs of said cyclic memories to the output of said sequential buffer,
a control circuit connected with said storage device and said first means for initially inserting first and second special indicia in said cyclic memories, for controlling the transfer of data from said storage device to said cyclic memories and for causing the reinsertion of said first and second special indicia in said cyclic memories, said first and second special indicia respectively serving to identify the beginning and end of data in said cyclic memories, and
data spacing means connected with said second means, said control circuit and said storage device for sensing said first and second special indicia stored in said cyclic memories and for controlling said control circuit to cause the transfer of data from said storage device to said cyclic memories in response to said second special indicia at a predetermined rated determined by said data spacing means and to cause the reinsertion of said second special indicia in said cyclic memories after the transfer of data from said storage device, and for controlling the transfer of data from said cyclic memories in response to said first special indicia through said second means to the output of said sequential buffer at a like rate and for controlling said control circuit to cause the reinsertion of said first special indicia after the transfer of data from said cyclic memories.

11. A sequential buffer including an input for receiving data at an asynchronous rate and an output for applying data to an output device at one or more synchronous rates, the improvement comprising a storage device having an input connected with said input to said sequential buffer and having an output,
input data gates having an input and an output,
said storage device being connected to the input of said input data gates,
write circuits having an input and an output,
the output of said input data gates being connected to the input of said write circuits,
a plurality of cyclic memories having inputs and outputs,
the output of said write circuits being connected with the inputs of said cyclic memories,
read circuits having an input and an output,
the outputs of said cyclic memories being connected to the input of said read circuits,
output data gates having an input connected with the output of said read circuits and having an output connected with an output device,
a control circuit connected with said storage device and said input data gates to control the transfer of data stored in said storage device through said input data gates and said write circuits to said cyclic memories, to control the insertion of first and second special indicia into said cyclic memories prior to the transfer of data thereto from said storage device and to control the reinsertion of said first and second special indicia into said cyclic memories after the respective transfer of data from and to said cyclic memories,
and input data control means responsive to said second special indicia having an input connected with the output of said read circuits, and having outputs connected with said storage device and said control circuit, and an enable input connected from said control circuit,
an output data control means responsive to said first special indicia having an input connected with the output of said read circuits, and an output connected with said control circuit and said output data gates, and an enable input connected from said control circuit,
whereby input data is stored in said storage device, said input data control means and said control circuit control the transfer of data from said storage device to said cyclic memories at one or more predetermined rates after the detection of said second special indicia by said input data control means, and said output data control means controls the transfer of data from said cyclic memories through said output data gates to said output device at one or more like predetermined rates after the detection of said first special indicia by said output data control means.

12. A large capacity sequential buffer having the characteristics of a large capacity sequential core buffer, the improvement comprising a cyclic memory device into which information may be stored,
a small memory device selectively connectible with said cyclic memory device for storing information during the access time of the cyclic memory device,
first means connected with said cyclic memory device and said small memory device for causing the storage of first and second special characters in said cyclic memory device, and for controlling the transfer of information from said small memory device to said cyclic memory device,
second means connected with said small memory device and said first means and responsive to said second special character stored in said cyclic memory device for causing said small memory device to supply said information to the cyclic memory device at a predetermined rate,
third means connected with said cyclic memory device for selectively reading data therefrom to an output device, and
fourth means connected with said first means and responsive to said first special character stored in said cyclic memory device for causing said third means to read data from said cyclic memory device at an output rate determined by the rate at which information is supplied to the cyclic memory device from said small memory device.

13. A large capacity sequential buffer having the characteristics of a similar capacity sequential core buffer including an input for receiving data, a static memory connected with said input for receiving data therefrom, and an output for applying data to an output device, the improvement comprising a cyclic memory connected with said static memory for receiving data therefrom,
output means coupled with said cyclic memory and said output for supplying data from the former to the latter,
control means coupled with said static memory and said cyclic memory for inserting first and second special characters into said cyclic memory, and for controlling the spacing between said special characters,
said control means causing a first data character to be read from said static memory and replace the second special data character in said cyclic memory, causing additional data characters to be read from the static memory into the cyclic memory at an input rate which in turn determines the maximum output rate of the cyclic memory, and causing the reinsertion of said second special data character to indicate the end of the data transferred from the static memory to the cyclic memory, and
means including timing means for determining said input rate coupled with the cyclic memory and said output means for sensing said first special data character in said cyclic memory and causing the gating out by said output means of data from said cyclic memory at a rate equal to, or slower than, said input rate.

14. A device as in claim 13 wherein said means including timing means comprising gating means for detecting said first and second special characters, and spacing counters for controlling the spacing of data transferred between said cyclic memory and said output, and between said static memory and said cyclic memory.

15. A large capacity buffer including an input for receiving data, a first memory connected with said input for receiving data therefrom, and an output for applying data to an output device, the improvement comprising a cyclic memory connected with said first memory for receiving data therefrom,
output means coupled with said cyclic memory and said output for supplying data from the former to the latter,
control means coupled with said first memory and said cyclic memory for causing the insertion of first and second special indicia in a particular timed relationship into said cyclic memory, said control means causing a first data character to be read from said first memory and replace the second special indicia in said cyclic memory, causing additional data characters to be read from the first memory into the cyclic memory at an input rate which in turn determines the maximum output rate of the cyclic memory, and causing the reinsertion of said second special indicia into said cyclic memory to indicate the end of the data transferred from the first memory to the cyclic memory, and first and second detecting and counting means coupled with the cyclic memory, the control means and the output means, said second gating and counting means serving to detect the occurrence of said second special indicia in said cyclic memory for applying control signals to said control means for determining said input rate and for signalling said control means to cause data characters to be transferred from said first memory to said cyclic memory at said input rate, and said first gating and counting means serving to detect said first special indicia for enabling said output means after a predetermined time and at subsequent predetermined times to allow the transfer of data from said cyclic memory to said output at a desired rate or rates and for signalling said control means to cause the reinsertion of said first special indicia after said transfer to said output.

16. A device as in claim 15 wherein said cyclic memory includes a plurality of recirculating delay lines, and said first and second gating and counting means include gates for detecting respectively said first and second special indicia, and include spacing counters controlled by said gates and said control means which in turn supply output signals for respectively spacing output and input data being transferred between said cyclic memory and said output, and said first memory and said cyclic memory, respectively.

17. A large capacity buffer including an input for receiving data, a static memory connected with said input for receiving data therefrom, and an output for applying data to an output device, the improvement comprising a cyclic memory connected with said static memory for receiving data therefrom, output means coupled with said cyclic memory and said output for supplying data from the former to the latter, first control means coupled with said static memory and said cyclic memory for controlling the insertion of first and second special characters into said cyclic memory and for controlling data entry into the cyclic memory from said static memory, second control means coupled with said cyclic memory, said output means, said first control means, and said static memory, said second control means being enabled by said first control means and serving to detect said first and second special characters in said cyclic memory, serving to supply a data transfer signal to said static memory and said first control means in response to the detection of said second special character, and serving to supply a readout signal to said output means and said first control means in response to the detection of said first special character, and said first and second control means thereby causing a first data character to be read from said static memory and replace the second special data character in said cyclic memory, causing additional data characters to be read from the static memory into the cyclic memory at an input rate which in turn determines the maximum output rate of the cyclic memory, and causing the reinsertion of said second special data character to indicate the end of data transferred from the static memory to the cyclic memory, and causing the gating out by said output means of data from said cyclic memory at a rate equal to, or slower than, said input rate and subsequently causing the reinsertion of said first special character into said cyclic memory.

References Cited by the Examiner

UNITED STATES PATENTS

| | | | |
|---|---|---|---|
| 2,969,522 | 1/1961 | Crosby | 340—172.5 |
| 3,029,414 | 4/1962 | Schrimpf | 340—172.5 |
| 3,061,192 | 10/1962 | Terzian | 340—172.5 |

ROBERT C. BAILEY, *Primary Examiner.*

UNITED STATES PATENT OFFICE
CERTIFICATE OF CORRECTION

Patent No. 3,235,849 February 15, 1966

Walter Klein

It is hereby certified that error appears in the above numbered patent requiring correction and that the said Letters Patent should read as corrected below.

Column 1, line 19, for "speeed" read -- speed --; lines 62 to 64, strike out "This data is read from the small buffer into the cyclic memory at one or more fixed rates which determine the high speed output rates of the entire sequential buffer."; column 7, line 75, after "number" insert a comma; column 11, line 39, for "afer" read -- after --; line 70, for "the" read -- and --; column 12, line 47, for "aslo" read -- also --; column 16, line 49, after "count" insert -- of --; column 17, line 37, for "$Y_n$" read -- $X_n$ --; column 18, line 39, strike out "-unload", second occurrence; column 19, line 56, for "450" read -- 405 --; line 59, for "nected through respective diodes 404 and 405" read -- cuit 391, a diode 407 and a resistance 408 --; column 20, line 14, for "no-return-" read -- non-return- --; column 21, line 36, for "transistor" read -- transistors --.

Signed and sealed this 1st day of August 1967.

(SEAL)
Attest:

EDWARD M.FLETCHER,JR.
Attesting Officer

EDWARD J. BRENNER
Commissioner of Patents